(12) United States Patent
Tse et al.

(10) Patent No.: US 12,449,405 B2
(45) Date of Patent: Oct. 21, 2025

(54) PHOTOACOUSTIC DEVICE INCLUDING A LIGHT GUIDE SYSTEM CONFIGURED TO TRANSMIT LIGHT THROUGH AN ELECTROMAGNETIC INTERFERENCE (EMI)-REDUCING LAYER

(71) Applicant: QUALCOMM Incorporated, San Diego, CA (US)

(72) Inventors: Justin Tse, Poway, CA (US); Htet Naing, San Diego, CA (US); Hrishikesh Vijaykumar Panchawagh, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 18/320,056

(22) Filed: May 18, 2023

(65) Prior Publication Data

US 2024/0385145 A1    Nov. 21, 2024

(51) Int. Cl.
*G01N 29/24* (2006.01)
*G01N 21/17* (2006.01)

(52) U.S. Cl.
CPC ..... *G01N 29/2418* (2013.01); *G01N 21/1702* (2013.01); *G01N 2201/0625* (2013.01); *G01N 2201/0893* (2013.01); *G01N 2291/018* (2013.01); *G01N 2291/02466* (2013.01)

(58) Field of Classification Search
None
See application file for complete search history.

(56) References Cited

U.S. PATENT DOCUMENTS

| | | | |
|---|---|---|---|
| 2013/0042688 A1 | 2/2013 | Luo et al. | |
| 2014/0066743 A1* | 3/2014 | Nakajima | A61B 5/0095 600/407 |
| 2015/0122036 A1* | 5/2015 | Ida | G01H 9/00 73/655 |

(Continued)

FOREIGN PATENT DOCUMENTS

JP    2014039801 A    3/2014

OTHER PUBLICATIONS

International Search Report and Written Opinion—PCT/US2024/024146—ISA/EPO—Aug. 8, 2024.

*Primary Examiner* — Suman K Nath
(74) *Attorney, Agent, or Firm* — QUALCOMM Incorporated

(57) ABSTRACT

An apparatus may include a platen, an electromagnetic interference (EMI)-reducing system including a first EMI-reducing layer, a light source system and a receiver system. The light source system may include a light-emitting component, light source system circuitry and a light guide system and may be configured to emit light through the first EMI-reducing layer to a first platen area via a light pipe between the first EMI-reducing layer and the platen. The light guide system may include a light-directing element for directing light from the first EMI-reducing layer to the light pipe. The receiver system may be configured to detect acoustic waves corresponding to a photoacoustic response of a target object in contact with the first platen area to light emitted by the light source system. The first EMI-reducing layer may reduce a level of EMI emitted by the light source system circuitry that is received by receiver system circuitry.

27 Claims, 14 Drawing Sheets

(56) References Cited

U.S. PATENT DOCUMENTS

| | | |
|---|---|---|
| 2015/0208924 A1 | 7/2015 | Li et al. |
| 2016/0022178 A1* | 1/2016 | Wang .................... A61B 5/6887 600/316 |
| 2019/0371830 A1* | 12/2019 | Hsiao .................... H10D 86/441 |
| 2019/0377962 A1 | 12/2019 | Kitchens et al. |
| 2022/0415980 A1* | 12/2022 | Lee ....................... H10K 59/873 |

* cited by examiner

PHOTOACOUSTIC DEVICE INCLUDING A LIGHT GUIDE SYSTEM CONFIGURED TO TRANSMIT LIGHT THROUGH AN ELECTROMAGNETIC INTERFERENCE (EMI)-REDUCING LAYER

TECHNICAL FIELD

This disclosure relates generally to photoacoustic devices and systems.

DESCRIPTION OF RELATED TECHNOLOGY

A variety of different sensing technologies and algorithms are being implemented in devices for various biometric and biomedical applications, including health and wellness monitoring. This push is partly a result of the limitations in the usability of traditional measuring devices for continuous, noninvasive and ambulatory monitoring. Some such devices are, or include, photoacoustic devices. Although some previously-deployed photoacoustic devices and systems can provide acceptable results, improved photoacoustic devices and systems would be desirable.

SUMMARY

The systems, methods and devices of this disclosure each have several aspects, no single one of which is solely responsible for the desirable attributes disclosed herein.

One innovative aspect of the subject matter described in this disclosure can be implemented in an apparatus. The apparatus may include a platen, an electromagnetic interference (EMI)-reducing system including a first EMI-reducing layer, a light source system including a light-emitting component, light source system circuitry and a light guide system, and a receiver system. The receiver system may be, or may include, an ultrasonic receiver system including an array of receiver elements and receiver system circuitry. In some implementations, a mobile device (such as a wearable device, a cellular telephone, etc.) may be, or may include, at least part of the apparatus. In some examples, the first EMI-reducing layer may reduce a level of EMI emitted by the light source system circuitry that is received by the receiver system circuitry. In some examples, the light source system circuitry may be grounded separately from the receiver system circuitry.

According to some implementations, the light source system may be configured to transmit light from the light-emitting component through the first EMI-reducing layer to a first platen area. In some such implementations, the source system may be configured to emit light through an opening in the first EMI-reducing layer. In other implementations, the source system may be configured to emit light through a transparent portion of the first EMI-reducing layer. In some examples, the transparent portion of the first EMI-reducing layer may be, or may include, a transparent conductive material. According to some examples, the transparent conductive material may be, or may include, indium tin oxide.

In some implementations, the light guide system may include a light pipe residing between the first EMI-reducing layer and the platen. According to some implementations, the light guide system also may include a first light-directing element for directing light from the first EMI-reducing layer—for example, from the opening in the first EMI-reducing layer or from the transparent portion of the first EMI-reducing layer—to the light pipe.

According to some implementations, the receiver system may be configured to detect acoustic waves corresponding to a photoacoustic response of a target object in contact with the first platen area to light emitted by the light source system. In some examples, the first EMI-reducing layer may reduce a level of EMI emitted by the light source system circuitry that is received by the receiver system circuitry.

In some implementations, light pipe may have a greater width than a width of an opening in—or a transparent portion of—the first EMI-reducing layer. In some implementations, the first light-directing element may be configured to disperse light emerging from an opening in—or a transparent portion of—the first EMI-reducing layer and to provide dispersed light to the light pipe. According to some implementations, the first light-directing element may be, or may include, a dispersing lens. In some implementations, the first light-directing element may be, or may include, a tapered element having a smaller-width portion adjacent an opening in—or a transparent portion of—the first EMI-reducing layer and a larger-width portion adjacent the light pipe. According to some implementations, the light-emitting component may be adjacent an opening in—or a transparent portion of—the first EMI-reducing layer.

According to some implementations, the light guide system may include a second light-directing element for directing light from the light-emitting component to an opening in—or a transparent portion of—the first EMI-reducing layer. In some implementations, the second light-directing element may be, or may include, a focusing lens. In some implementations, the light-emitting component may have a greater width than the width of an opening in—or a transparent portion of—the first EMI-reducing layer. In some such implementations, the second light-directing element may be, or may include, a tapered element having a smaller-width portion adjacent an opening in—or a transparent portion of—the first EMI-reducing layer and a larger-width portion adjacent the light-emitting component.

In some examples, the first EMI-reducing layer may be a portion of an EMI-reducing component that encloses the light source system circuitry. According to some examples, the EMI-reducing system may include an EMI-reducing component that encloses the receiver system circuitry.

According to some examples, the receiver system may include at least a first receiver stack portion residing proximate a first side of the light pipe and a second receiver stack portion residing proximate a second side of the light pipe. In some examples, the first receiver stack portion may reside proximate a second platen area on a first side of the first platen area and the second receiver stack portion may reside proximate a third platen area on a second and opposite side of the first platen area. According to some examples, the first receiver stack portion and the second receiver stack portion may be portions of a receiver stack ring. In some examples, the receiver stack ring may be configured to surround the light pipe. According to some examples, an annular area of the platen proximate the receiver stack ring may be configured to surround the first platen area.

In some examples, the first EMI-reducing layer may include a conductive material having a resistivity of less than $3 \times 10^{-8}$ ohm-meters. According to some examples, the first EMI-reducing layer may include a material having a magnetic permeability of at least $5 \times 10^{-3}$ henries per meter.

In some implementations, the apparatus may include a control system. The control system may include one or more general purpose single- or multi-chip processors, digital signal processors (DSPs), application specific integrated circuits (ASICs), field programmable gate arrays (FPGAs)

or other programmable logic devices, discrete gates or transistor logic, discrete hardware components, or combinations thereof. The control system may be configured to determine one or more cardiac-related features based, at least in part, on receiver signals from the receiver system.

Some or all of the methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. The software may include instructions for controlling one or more devices to perform one or more disclosed methods.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements

DETAILED DESCRIPTION

Figure 1:
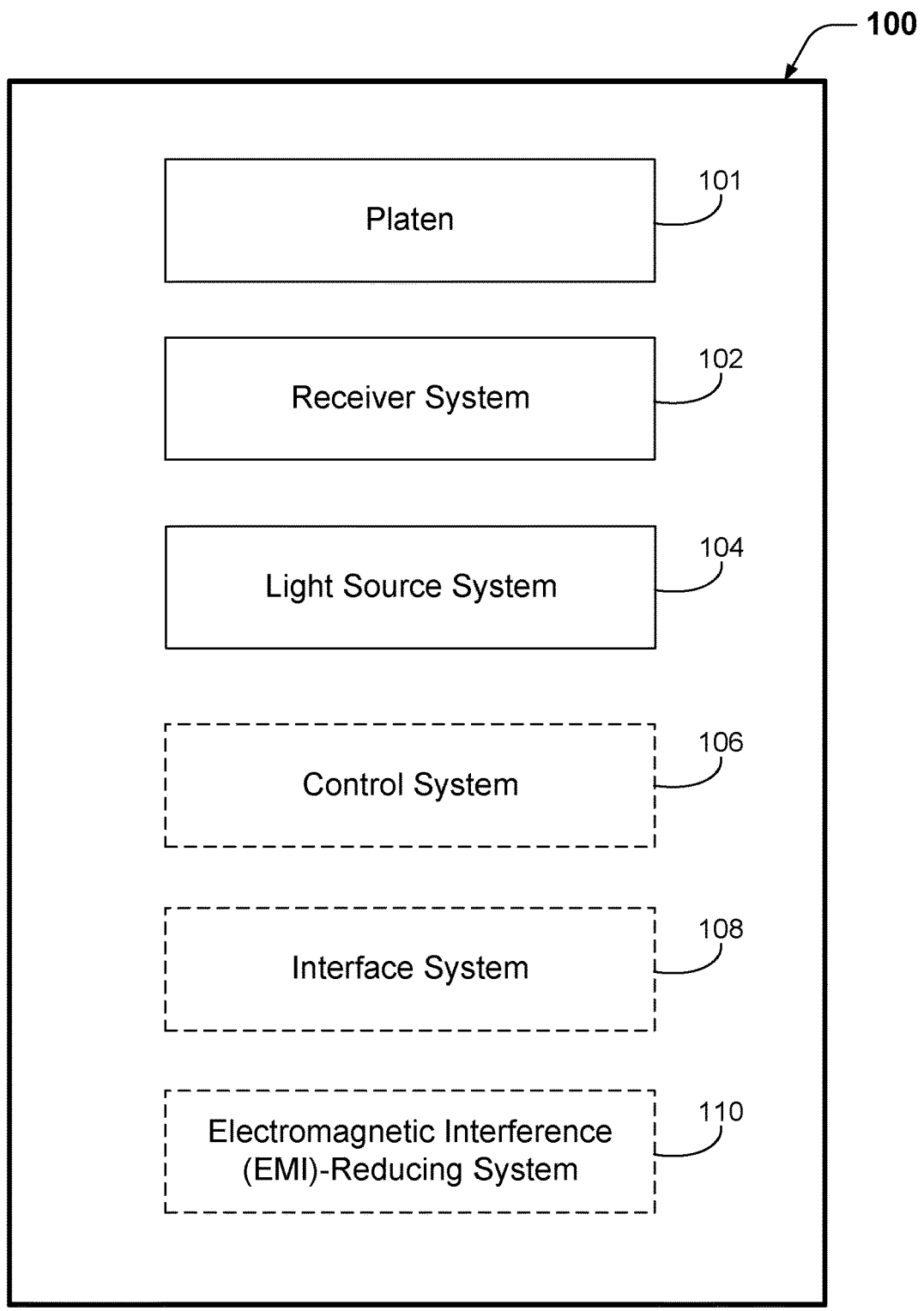
FIG. 1 is a block diagram that shows example components of an apparatus according to some disclosed implementations.

The following description is directed to certain implementations for the purposes of describing various aspects of this disclosure. However, a person having ordinary skill in the art will readily recognize that the teachings herein can be applied in a multitude of different ways. Some of the concepts and examples provided in this disclosure are especially applicable to blood pressure monitoring applications. However, some implementations also may be applicable to other types of biological sensing applications, as well as to other fluid flow systems. The described implementations may be implemented in any device, apparatus, or system that includes an apparatus as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, handheld or portable computers, netbooks, notebooks, smartbooks, tablets, printers, copiers, scanners, facsimile devices, global positioning system (GPS) receivers/navigators, cameras, digital media players, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), architectural structures, microwaves, refrigerators, stereo systems, cassette recorders or players, DVD players, CD players, VCRs, radios, portable memory chips, washers, dryers, washer/dryers, parking meters, automobile doors, autonomous or semi-autonomous vehicles, drones, Internet of Things (IoT) devices, etc. Thus, the teachings are not intended to be limited to the specific implementations depicted and described with reference to the drawings; rather, the teachings have wide applicability as will be readily apparent to persons having ordinary skill in the art.

Non-invasive health monitoring devices, such as photoacoustic plethysmography (PAPG)-capable devices, have various potential advantages over more invasive health monitoring devices such as cuff-based or catheter-based blood pressure measurement devices. However, it has proven to be difficult to design satisfactory PAPG-capable devices. For example, the receiver signals of PAPG-capable devices often have an unacceptably low signal-to-noise ratio (SNR). The low SNR is often caused, in part, by electromagnetic interference (EMI). Light source system circuitry is one source of EMI. In a compact PAPG-capable device, the light source system circuitry may be in close proximity to components of the receiver system. Light emitted by the light source system is another potential source of noise, in part because this light may induce a photoacoustic response in other components of the PAPG-capable device.

Some disclosed devices include a platen, an EMI-reducing system including a first EMI-reducing layer, a light source system and a receiver system. The first EMI-reducing layer may be component of an EMI-reducing system. The light source system may include a light-emitting component, light source system circuitry and a light guide system. The first EMI-reducing layer may reduce a level of EMI emitted by the light source system circuitry that is received by receiver system circuitry. The light guide system may include a light pipe residing between the first EMI-reducing layer and the platen. The light source system may be configured to emit light through an opening in, or a transparent portion of, the first EMI-reducing layer to a first platen area via the light pipe. In some examples, the light guide system may include a light-directing element for directing light that has passed through the first EMI-reducing layer to the light pipe. The receiver system may be configured to detect acoustic waves corresponding to a photoacoustic response of a target object in contact with the first platen area to light emitted by the light source system.

Particular implementations of the subject matter described in this disclosure can be implemented to realize one or more of the following potential advantages. Various disclosed configurations include PAPG-capable devices that are compact enough to reside in a wearable device. Configurations in which the receiver stack portions flank, or surround, a central light source can enhance the sensitivity of the device to received photoacoustic waves, such as arterial photoacoustic waves. According to some implementations, the receiver system may be shielded from electromagnetic interference (EMI) caused by circuitry of the light source system and shielded from light emitted by the light source system. In some examples, acoustic impedance matching layers may mitigate unwanted reflections of acoustic waves, thereby mitigating another type of noise.

FIG. 1 is a block diagram that shows example components of an apparatus according to some disclosed implementations. In this example, the apparatus 100 includes a platen 101, a receiver system 102, a light source system 104 and a EMI-reducing system 110. Some implementations of the apparatus 100 may include a control system 106, an interface system 108, or both.

The platen 101 may be made of any suitable material, such as glass, acrylic, polycarbonate, etc. According to some examples, the platen 101 (or another portion of the apparatus) may include one or more anti-reflective layers. In some examples, one or more anti-reflective layers may reside on, or proximate, one or more outer surfaces of the platen 101.

In some examples, at least a portion of the outer surface of the platen 101 may have an acoustic impedance that is configured to approximate an acoustic impedance of human skin. The portion of the outer surface of the platen 101 may, for example, be a portion that is configured to receive a target object, such as a human digit. (As used herein, the terms "finger" and "digit" may be used interchangeably, such that a thumb is one example of a finger.) A typical range of acoustic impedances for human skin is 1.53-1.680 MRayls. In some examples, at least an outer surface of the platen 101 may have an acoustic impedance that is in the range of 1.4-1.8 MRayls, or in the range of 1.5-1.7 MRayls. Alternatively, or additionally, in some examples at least an outer surface of the platen 101 may be configured to conform to a surface of human skin. In some such examples, at least an outer surface of the platen 101 may have material properties like those of putty or chewing gum.

In some examples, at least a portion of the platen 101 may have an acoustic impedance that is configured to approximate an acoustic impedance of one or more receiver elements of the receiver system 102. According to some examples, a layer residing between the platen 101 and one or more receiver elements may have an acoustic impedance that is configured to approximate an acoustic impedance of the one or more receiver elements. Alternatively, or additionally, in some examples a layer residing between the platen 101 and one or more receiver elements may have an acoustic impedance that is in an acoustic impedance range between an acoustic impedance of the platen and an acoustic impedance of the one or more receiver elements.

According to some examples, the receiver system 102 may include at least two receiver stack portions: a first receiver stack portion may reside proximate a first side of the light pipe and a second receiver stack portion may reside proximate a second side of light pipe. The first receiver stack portion and the second receiver stack portion may, in some examples, be portions of a first receiver stack ring. The receiver stack ring may be configured to surround the light pipe. In other examples, the first receiver stack portion and the second receiver stack portion may be elements of a receiver array.

In this implementation, the receiver system 102 is, or includes, an ultrasonic receiver system. In some examples, the receiver system 102 may be configured to detect acoustic waves corresponding to a photoacoustic response of the target object to light emitted by the light source system. In some examples, the receiver system 102 may include a piezoelectric receiver layer, such as a layer of polyvinylidene difluoride (PVDF) polymer, polyvinylidene fluoride-trifluoroethylene (PVDF-TrFE) copolymer, a piezoelectric composite, etc. In some implementations, a single piezoelectric layer may serve as an ultrasonic receiver. In some implementations, other piezoelectric materials may be used in the piezoelectric layer, such as aluminum nitride (AlN) or lead zirconate titanate (PZT). The receiver system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers. According to some examples, the receiver system 102 may be, or may include, an ultrasonic receiver array. In some examples, the apparatus 100 may include one or more separate ultrasonic transmitter elements. In some such examples, the ultrasonic transmitter(s) may include an ultrasonic plane-wave generator. In some examples, the receiver system 102 may include an optical receiver system.

According to some examples, the light source system 104 may include a light-emitting component, light source system circuitry and a light guide system. In some examples, the light source system 104 may be configured to emit light through a first EMI-reducing layer of the EMI-reducing system 110 to a first area of the platen 101 towards a target object in contact with the first area of the platen 101. In some such examples, the light source system 104 may be configured to emit light through an opening in the first EMI-reducing layer, whereas in other examples the light source system 104 may be configured to emit light through a transparent portion of the first EMI-reducing layer. In some examples, the light guide system 104 may include a light pipe residing between the first EMI-reducing layer and the platen 101. According to some examples, the light guide system 104 may include a first light-directing element for directing light from an opening in the first EMI-reducing layer—or from a transparent portion of the first EMI-reducing layer—to the light pipe.

In some examples, the light guide system 104 may include a second light-directing element for directing light from the light-emitting component to an opening in, or to a transparent portion of, the first EMI-reducing layer. However, in some alternative examples, the light-emitting component may be adjacent to an opening in, or to a transparent portion of, the first EMI-reducing layer. In such examples, the second light-directing element may not be necessary.

The light source system 104 may, in some examples, include one or more light-emitting diodes. In some implementations, the light source system 104 may include one or more laser diodes. According to some implementations, the light source system 104 may include one or more vertical-cavity surface-emitting lasers (VCSELs). In some implementations, the light source system 104 may include one or more edge-emitting lasers. In some implementations, the light source system may include one or more neodymium-doped yttrium aluminum garnet (Nd:YAG) lasers.

The light source system 104 may, in some examples, be configured to transmit light in one or more wavelength ranges. In some examples, the light source system 104 may configured for transmitting light in a wavelength range of 500 to 600 nanometers. According to some examples, the light source system 104 may configured for transmitting light in a wavelength range of 800 to 950 nanometers.

The light source system 104 may include various types of drive circuitry, depending on the particular implementation. In some disclosed implementations, the light source system 104 may include at least one multi-junction laser diode, which may produce less noise than single-junction laser diodes. In some examples, the light source system 104 may include a drive circuit (also referred to herein as drive circuitry) configured to cause the light source system to emit pulses of light at pulse widths in a range from 3 nanoseconds to 1000 nanoseconds. According to some examples, the light source system 104 may include a drive circuit configured to cause the light source system to emit pulses of light at pulse repetition frequencies in a range from 1 kilohertz to 100 kilohertz.

In some implementations, the light source system 104 may be configured for emitting various wavelengths of light, which may be selectable to trigger acoustic wave emissions primarily from a particular type of material. For example, because the hemoglobin in blood absorbs near-infrared light very strongly, in some implementations the light source system 104 may be configured for emitting one or more wavelengths of light in the near-infrared range, in order to trigger acoustic wave emissions from hemoglobin. However, in some examples the control system 106 may control the wavelength(s) of light emitted by the light source system 104 to preferentially induce acoustic waves in blood vessels, other soft tissue, and/or bones. For example, an infrared (IR) light-emitting diode LED may be selected and a short pulse of IR light emitted to illuminate a portion of a target object and generate acoustic wave emissions that are then detected by the receiver system 102. In another example, an IR LED and a red LED or other color such as green, blue, white or ultraviolet (UV) may be selected and a short pulse of light emitted from each light source in turn with ultrasonic images obtained after light has been emitted from each light source. In other implementations, one or more light sources of different wavelengths may be fired in turn or simultaneously to generate acoustic emissions that may be detected by the ultrasonic receiver. Image data from the ultrasonic receiver that is obtained with light sources of different wavelengths and at different depths (e.g., varying RGDs) into the target object may be combined to determine the location and type of material in the target object. Image contrast may occur as materials in the body generally absorb light at different wavelengths differently. As materials in the body absorb light at a specific wavelength, they may heat differentially and generate acoustic wave emissions with sufficiently short pulses of light having sufficient intensities. Depth contrast may be obtained with light of different wavelengths and/or intensities at each selected wavelength. That is, successive images may be obtained at a fixed RGD (which may correspond with a fixed depth into the target object) with varying light intensities and wavelengths to detect materials and their locations within a target object. For example, hemoglobin, blood glucose or blood oxygen within a blood vessel inside a target object such as a finger may be detected photoacoustically.

According to some implementations, the light source system 104 may be configured for emitting a light pulse with a pulse width less than about 100 nanoseconds. In some implementations, the light pulse may have a pulse width between about 10 nanoseconds and about 500 nanoseconds or more. According to some examples, the light source system may be configured for emitting a plurality of light pulses at a pulse repetition frequency between 10 Hz and 100 kHz. Alternatively, or additionally, in some implementations the light source system 104 may be configured for emitting a plurality of light pulses at a pulse repetition frequency between about 1 MHz and about 100 MHz. Alternatively, or additionally, in some implementations the light source system 104 may be configured for emitting a plurality of light pulses at a pulse repetition frequency between about 10 Hz and about 1 MHz. In some examples, the pulse repetition frequency of the light pulses may correspond to an acoustic resonant frequency of the ultrasonic receiver and the substrate. For example, a set of four or more light pulses may be emitted from the light source system 104 at a frequency that corresponds with the resonant frequency of a resonant acoustic cavity in the sensor stack, allowing a build-up of the received ultrasonic waves and a higher resultant signal strength. In some implementations, filtered light or light sources with specific wavelengths for detecting selected materials may be included with the light source system 104. In some implementations, the light source system may contain light sources such as red, green and blue LEDs of a display that may be augmented with light sources of other wavelengths (such as IR and/or UV) and with light sources of higher optical power. For example, high-power laser diodes or electronic flash units (e.g., an LED or xenon flash unit) with or without filters may be used for short-term illumination of the target object.

In some implementations, the apparatus (for example, the receiver system 102, the light source system 104, or both) may include one or more sound-absorbing layers, acoustic isolation material, light-absorbing material, light-reflecting material, or combinations thereof. In some examples, acoustic isolation material may reside between the light source system 104 and at least a portion of the receiver system 102. In some examples, the apparatus (for example, the receiver system 102, the light source system 104, or both) may include one or more electromagnetically shielded transmission wires. In some such examples, the one or more electromagnetically shielded transmission wires may be configured to reduce electromagnetic interference from the light source system 104 that is received by the receiver system 102.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 106 may be configured for receiving and processing data from the receiver system 102, e.g., as described below. If the apparatus 100 includes an ultrasonic transmitter, the control system 106 may be configured for controlling the ultrasonic transmitter. In some implementations, functionality of the control system 106 may be partitioned between one or more controllers or processors, such as a dedicated sensor controller and an applications processor of a mobile device.

In some examples, the control system 106 may be configured to control the light source system 104. For example, the control system 106 may be configured to control one or more light-emitting portions of the light source system 104 to emit laser pulses. The laser pulses may, in some examples, be in a wavelength range of 600 nm to 1000 nm. The laser pulses may, in some examples, have pulse widths in a range from 3 nanoseconds to 1000 nanoseconds. In some examples, the control system 106 may be configured to receive signals from the ultrasonic receiver system 102 corresponding to the ultrasonic waves generated by the target object responsive to the light from the light source system 104. In some examples, the control system 106 may be configured to estimate one or more cardiac features based, at least in part, on the signals. According to some examples, the cardiac features may be, or may include, blood pressure.

Some implementations of the apparatus 100 may include the interface system 108. In some examples, the interface system 108 may include a wireless interface system. In some implementations, the interface system 108 may include a user interface system, one or more network interfaces, one or more interfaces between the control system 106 and a memory system and/or one or more interfaces between the control system 106 and one or more external device interfaces (e.g., ports or applications processors), or combinations thereof. According to some examples in which the interface system 108 is present and includes a user interface system, the user interface system may include a microphone system, a loudspeaker system, a haptic feedback system, a voice command system, one or more displays, or combinations thereof. According to some examples, the interface system 108 may include a touch sensor system, a gesture sensor system, or a combination thereof. The touch sensor system (if present) may be, or may include, a resistive touch sensor system, a surface capacitive touch sensor system, a projected capacitive touch sensor system, a surface acoustic wave touch sensor system, an infrared touch sensor system, any other suitable type of touch sensor system, or combinations thereof.

In some examples, the interface system 108 may include, a force sensor system. The force sensor system (if present) may be, or may include, a piezo-resistive sensor, a capacitive sensor, a thin film sensor (for example, a polymer-based thin film sensor), another type of suitable force sensor, or combinations thereof. If the force sensor system includes a piezo-resistive sensor, the piezo-resistive sensor may include silicon, metal, polysilicon, glass, or combinations thereof. In some examples, the interface system 108 may include an optical sensor system, one or more cameras, or a combination thereof.

In this example, the apparatus 100 includes an EMI-reducing system 110. In some examples, the EMI-reducing system 110 may include one or more electromagnetically shielded transmission wires. In some such examples, the one or more electromagnetically shielded transmission wires may be configured to reduce electromagnetic interference from circuitry of the light source system 104, receiver system circuitry, or combinations thereof, that is received by the receiver system 102. In some examples, the light source system circuitry may be grounded separately from the receiver system circuitry.

According to some examples, the EMI-reducing system 110 includes at least a first EMI-reducing layer residing between circuitry of the light source system 104 and one or more elements of the receiver system 102. The first EMI-reducing layer may, in some examples, include a conductive material having a resistivity of less than $3 \times 10^{-8}$ ohm-meters. According to some examples, the first EMI-reducing layer may include a material having a magnetic permeability of at least $5 \times 10^{-3}$ henries per meter. The first EMI-reducing layer may, in some examples, be a portion of an EMI-reducing component that encloses the light source system circuitry. In some examples, the light source system 104 may be configured to emit light through the first EMI-reducing layer to a first platen area. In some such examples, the light source system 104 may be configured to emit light through an opening in the first EMI-reducing layer. In other examples, the light source system 104 may be configured to emit light through a transparent portion of the first EMI-reducing layer. The transparent portion may include transparent conductive material, such as indium tin oxide (ITO). In some examples, the EMI-reducing system 110 may include an EMI-reducing component that encloses the receiver system circuitry.

According to some examples, the EMI-reducing system 110 may be part of a noise reduction system. For example, the noise reduction system may include one or more mirrors that are configured to reflect light from the light source system 104 away from the receiver system 102. In some implementations, the noise reduction system may include one or more sound-absorbing layers, acoustic isolation material, light-absorbing material, light-reflecting material, or combinations thereof. In some examples, the noise reduction system may include acoustic isolation material, which may reside between the light source system 104 and at least a portion of the receiver system 102, on at least a portion of the receiver system 102, or combinations thereof.

The apparatus 100 may be used in a variety of different contexts, many examples of which are disclosed herein. For example, in some implementations a mobile device may include the apparatus 100. In some such examples, the mobile device may be a smart phone. In some implementations, a wearable device may include the apparatus 100. The wearable device may, for example, be a bracelet, an armband, a wristband, a watch, a ring, a headband or a patch.

Figure 2:
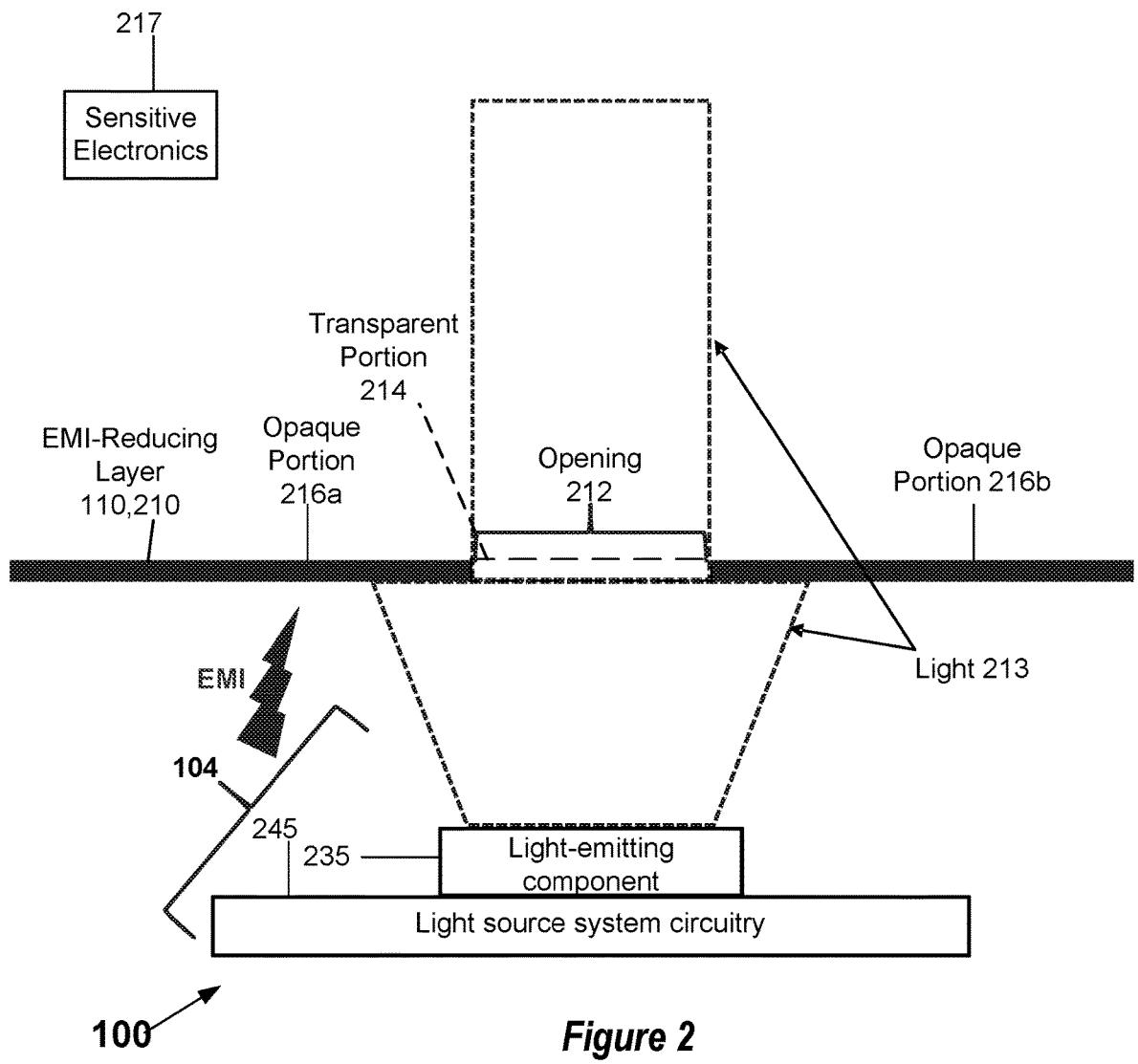
FIG. 2 shows some elements of a photoacoustic plethysmography (PAPG)-capable device.

FIG. 2 shows some elements of a photoacoustic plethysmography (PAPG)-capable device. As with other disclosed examples, the types, numbers and arrangements of elements shown in FIG. 2 are merely examples for illustrative purposes. Other examples may include different numbers of elements, types of elements, arrangements of elements, or combinations thereof.

In this example, the apparatus 100 includes a light source system 104 having a light-emitting component 235 and light source system circuitry 245. According to this example, the apparatus 100 includes an EMI-reducing layer 210 of an EMI-reducing system 110. In some examples, the EMI-reducing layer 210 may be referred to herein as a "first EMI-reducing layer." According to some examples, the EMI-reducing layer 210 may be a portion of an EMI-reducing component that encloses the light source system circuitry 245. In this example, the EMI-reducing layer 210 reduces the level of EMI that is emitted by the light source system circuitry 245 and received by sensitive electronics 217, which may include elements of the receiver system 102 (not shown).

In this example, the EMI-reducing layer 210 includes opaque portions 216a and 216b. Here, there is an opening 212 between the opaque portions 216a and 216b. In some alternative examples, the EMI-reducing layer 210 may include a transparent portion 214 between the opaque portions 216a and 216b. According to some such examples, the transparent portion 214 may be, or may include, transparent conductive material, such as indium tin oxide (ITO).

In this example, the light-emitting component 235 is shown emitting light 213, some of which travels through the opening 212. Implementations such as that shown in FIG. 2 are not optimal, because only a portion of the full optical power that is emitted by the light-emitting component 235 is transmitted through the EMI-reducing layer 210.

FIGS. 3A, 3B, 3C and 3D show elements of alternative PAPG-capable devices. In these examples, the apparatus 100 includes a platen 101, a receiver system 102 and a light source system 104. As with other disclosed examples, the types, numbers and arrangements of elements shown in FIGS. 3A-3D are merely examples for illustrative purposes. Other examples may include different numbers of elements, types of elements, arrangements of elements, or combinations thereof.

According to these examples, the receiver system 102 is, or includes, an ultrasonic receiver system. In this example, the receiver system 102 includes the receiver stack portion 102a and the receiver stack portion 102b, as well as receiver system circuitry. The receiver system circuitry is not shown in FIG. 3A, 3B or 3D. According to these examples, the receiver stack portion 102a resides proximate a first side of the light guide component 240 and the receiver stack portion 102b resides proximate a second side of the light guide component 240.

In some examples, the receiver stack portions 102a and 102b may be part of a continuous receiver stack. In some such examples, the continuous receiver stack may have a ring shape when viewed along the z axis. In other examples, the continuous receiver stack may have a different shape, such as an oval shape, a rectangular or other polygonal shape, etc., when viewed along the z axis. In some examples, the receiver stack portions 102a and 102b may be part of a receiver array that includes additional receiver stack portions. Some examples of receiver stack arrangements that include the receiver stack portions 102a and 102b are described herein with reference to FIGS. 4A-4D.

In these examples, the light source system 104 includes a light-emitting component 235, a light guide system 219 and light source system circuitry 245. The light-emitting component 235 may, for example, include one or more light-emitting diodes, one or more laser diodes, one or more VCSELs, one or more edge-emitting lasers, one or more neodymium-doped yttrium aluminum garnet (Nd:YAG) lasers, or combinations thereof. According to these examples, the EMI-reducing layer 210 is a portion of an EMI-reducing component 310 that encloses the light source system circuitry 245.

According to these examples, the light guide system 219 includes a light guide component 240 residing between the EMI-reducing layer 210 and the platen 101. The light guide component 240 may include any suitable material, or combination of materials, for causing at least some of the light emitted by the light-emitting component 235 to propagate within the light guide component 240, for example due to total internal reflection between one or more core materials and one or more cladding materials of the light guide component 240. In some examples, the core material(s) may include glass, silica, quartz, plastic, zirconium fluoride, chalcogenide, or combinations thereof. According to some examples, the cladding material(s) may include polyvinyl chloride (PVC), acrylic, polytetrafluoroethylene (PTFE), silicone or fluorocarbon rubber. The light guide component 240 may, in some examples, include one or more optical fibers. As used herein, the terms "light guide" and "light pipe" may be used synonymously.

In some examples, the width W of the light guide component 240 may be in the range of 0.25 mm to 3 mm, for example 0.5 mm, 1.0 mm, 1.5 mm, etc. According to some examples, the width W1 of the platen 101 may be in the range of 2 mm to 10 mm, for example 4 mm, 5 mm, 6 mm, etc. In some examples, there may be a space between the receiver stack portion 102a and the light guide component 240 and a space between the receiver stack portion 102b and the light guide component 240. In some such examples, the space may include light-absorbing material.

According to these examples, the light guide system 219 also includes a light-directing element 211a that is configured for directing light transmitted through the opening 212 in—or light transmitted through a transparent portion 214 of—the EMI-reducing layer 210 to the light guide component 240. In these examples, the light-directing element 211a—which may be referred to herein as a "first light-directing element"—is configured to disperse light emerging from the opening 212 or the transparent portion 214 and to provide dispersed light to the light guide component 240. In FIGS. 3A-3D, the light-directing element 211a is represented as a tapered element having a width (along the x axis) that increases from a first side proximate the EMI-reducing layer 210 to a second side coupled to the light guide component 240. Accordingly, the first light-directing element is, or includes, a tapered element having a smaller-width portion adjacent the opening 212 or the transparent portion 214 and a larger-width portion adjacent the light guide component 240. In these examples, the width W of the light guide component 240 is greater than the width of the opening 212 or the width of the transparent portion 214.

Figure 3A:
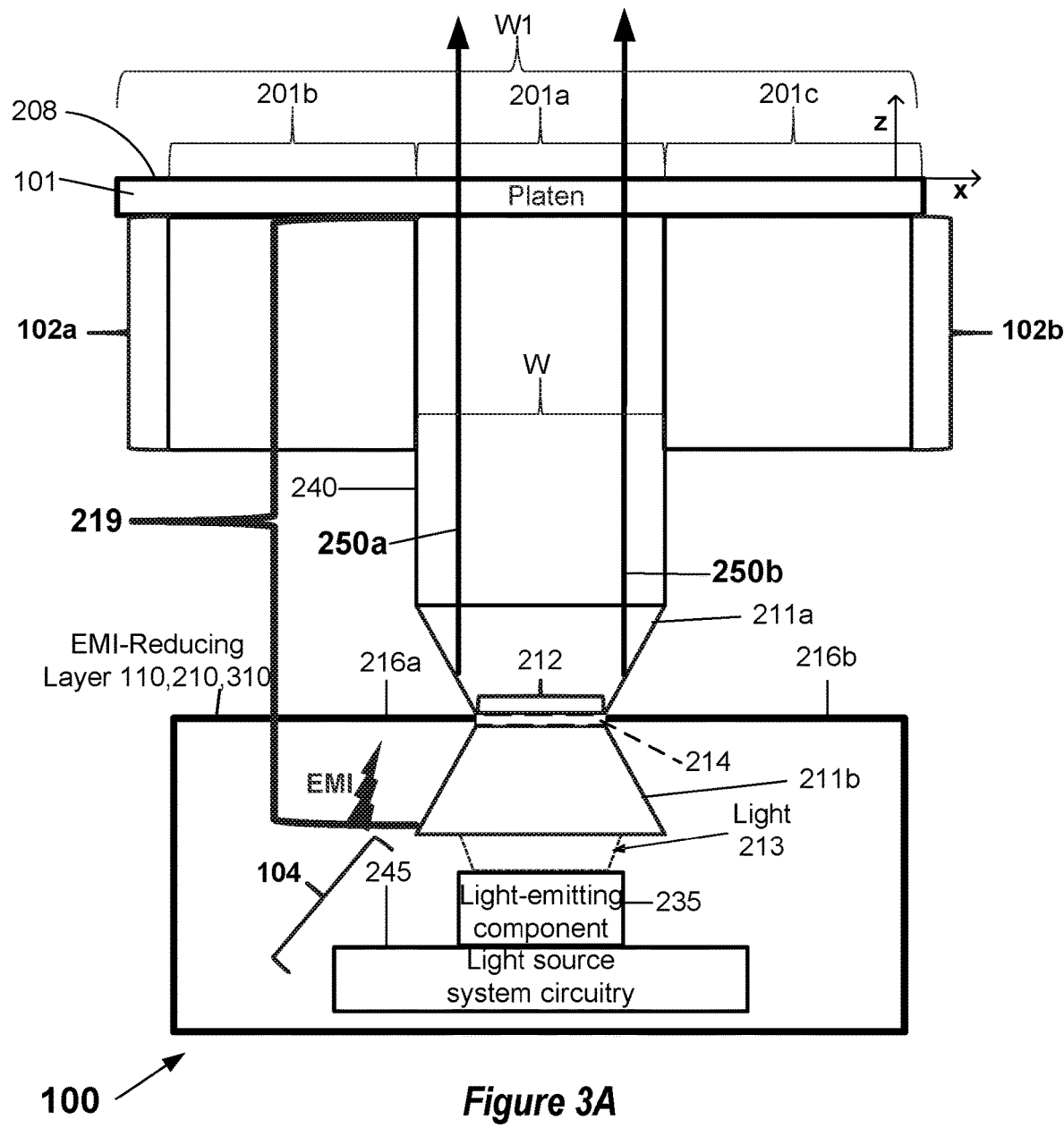
FIGS. 3A, 3B, 3C and 3D show elements of alternative PAPG-capable devices.
Figure 3B:
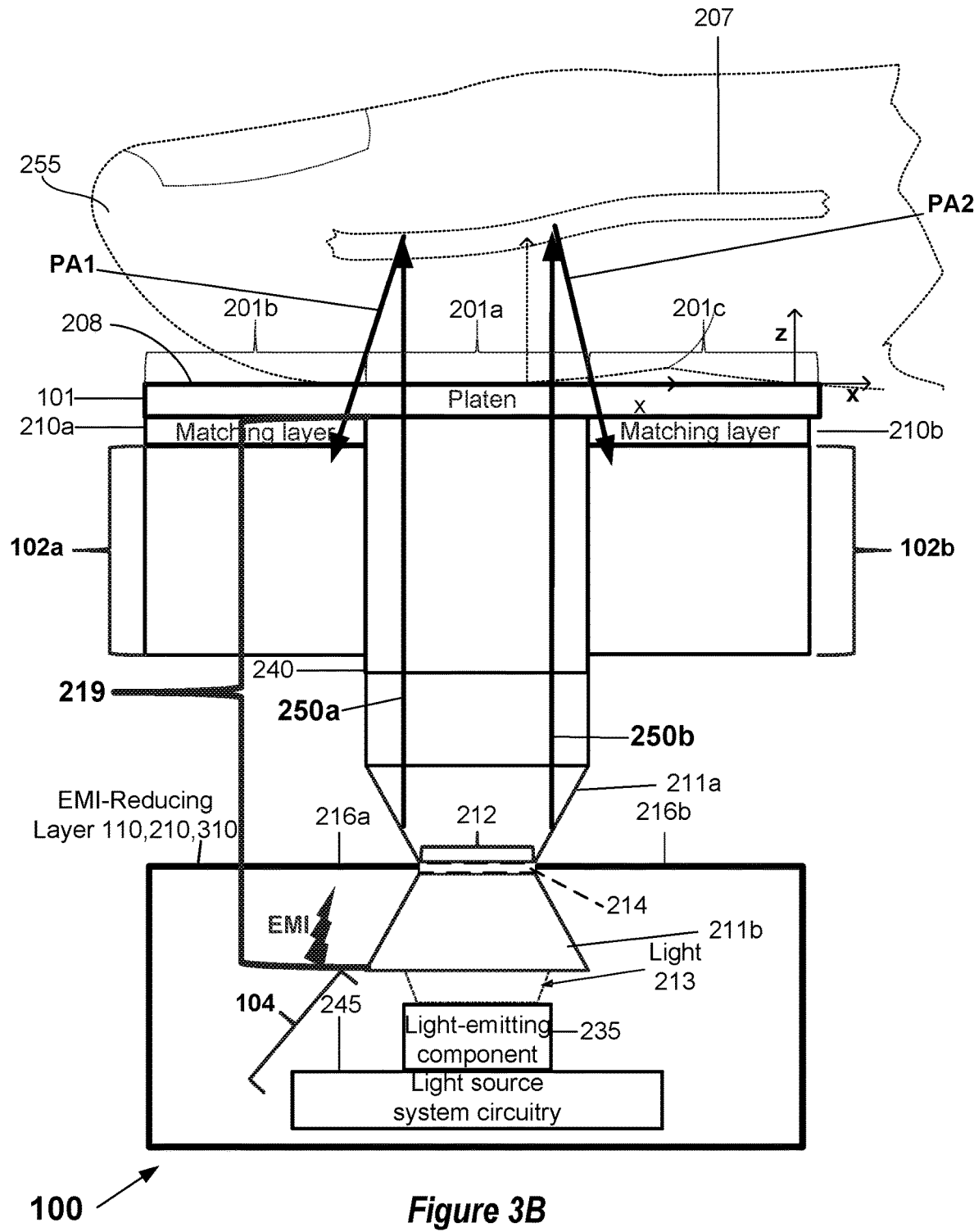
Figure 3C:
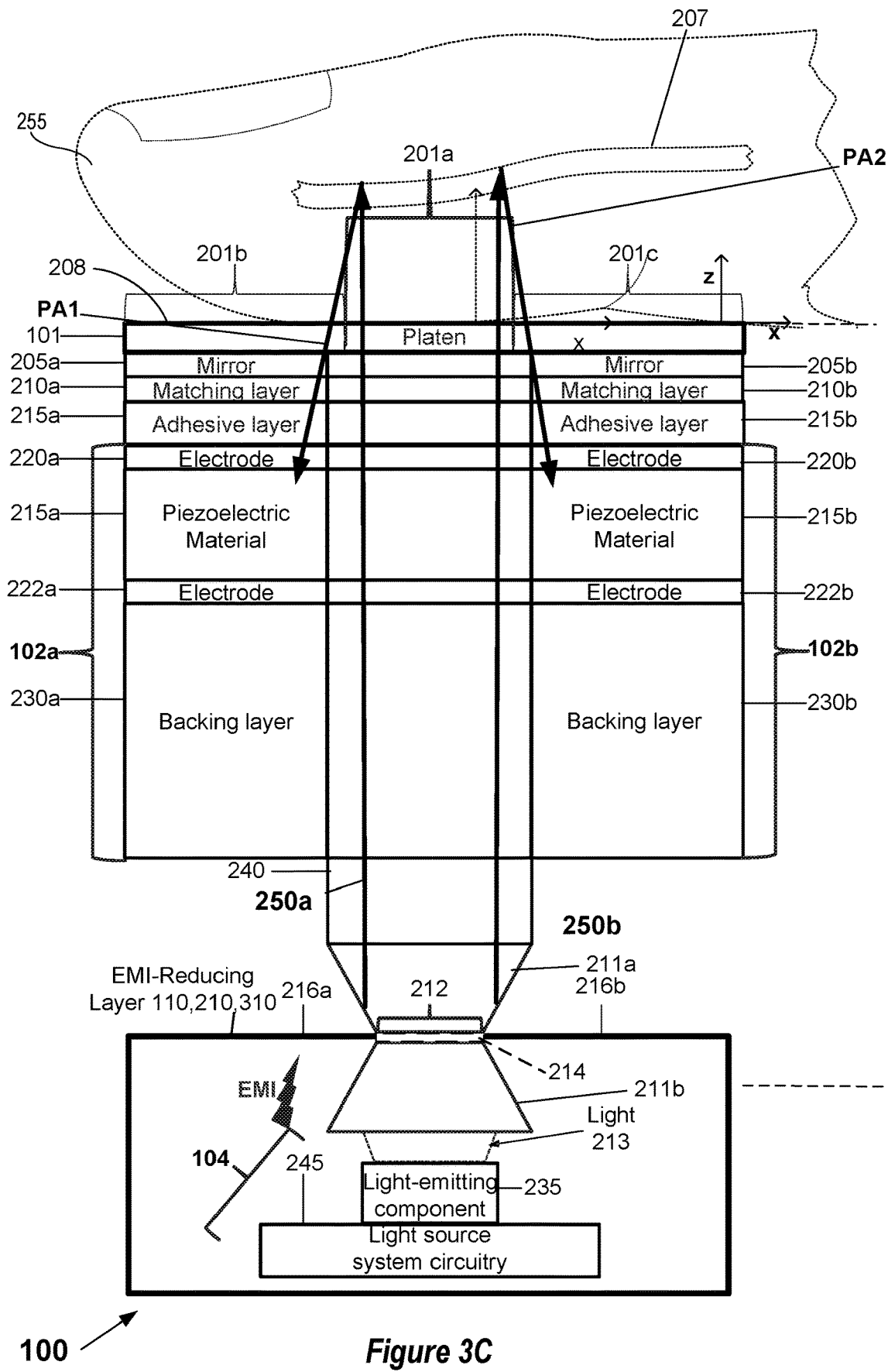

According to the examples shown in FIGS. 3A, 3B and 3C, the light guide system 219 also includes a light-directing element 211b that is configured for directing light from light-emitting component 235 to the opening 212 in—or to a transparent portion 214 of—the EMI-reducing layer 210. In FIGS. 3A-3C, the light-directing element 211b is represented as having a width (along the x axis) that decreases from a first side proximate the light-emitting component 235 to a second side coupled to the EMI-reducing layer 210. In these examples, the light-emitting component 211b has a greater width than a width of the opening 212 or the transparent portion 214. According to these examples, the light-directing element 211b—which may be referred to herein as a "second light-directing element"—comprises a tapered element having a smaller-width portion adjacent the opening 212 or the transparent portion 214 and a larger-width portion adjacent the light-emitting component 235. According to some examples, the first side of the light-directing element 211b may be coupled to the light-emitting component 235. In some examples, the light-directing elements 211a and 211b may include one or more of the same materials of which the light guide component 240 is formed.

Figure 3D:
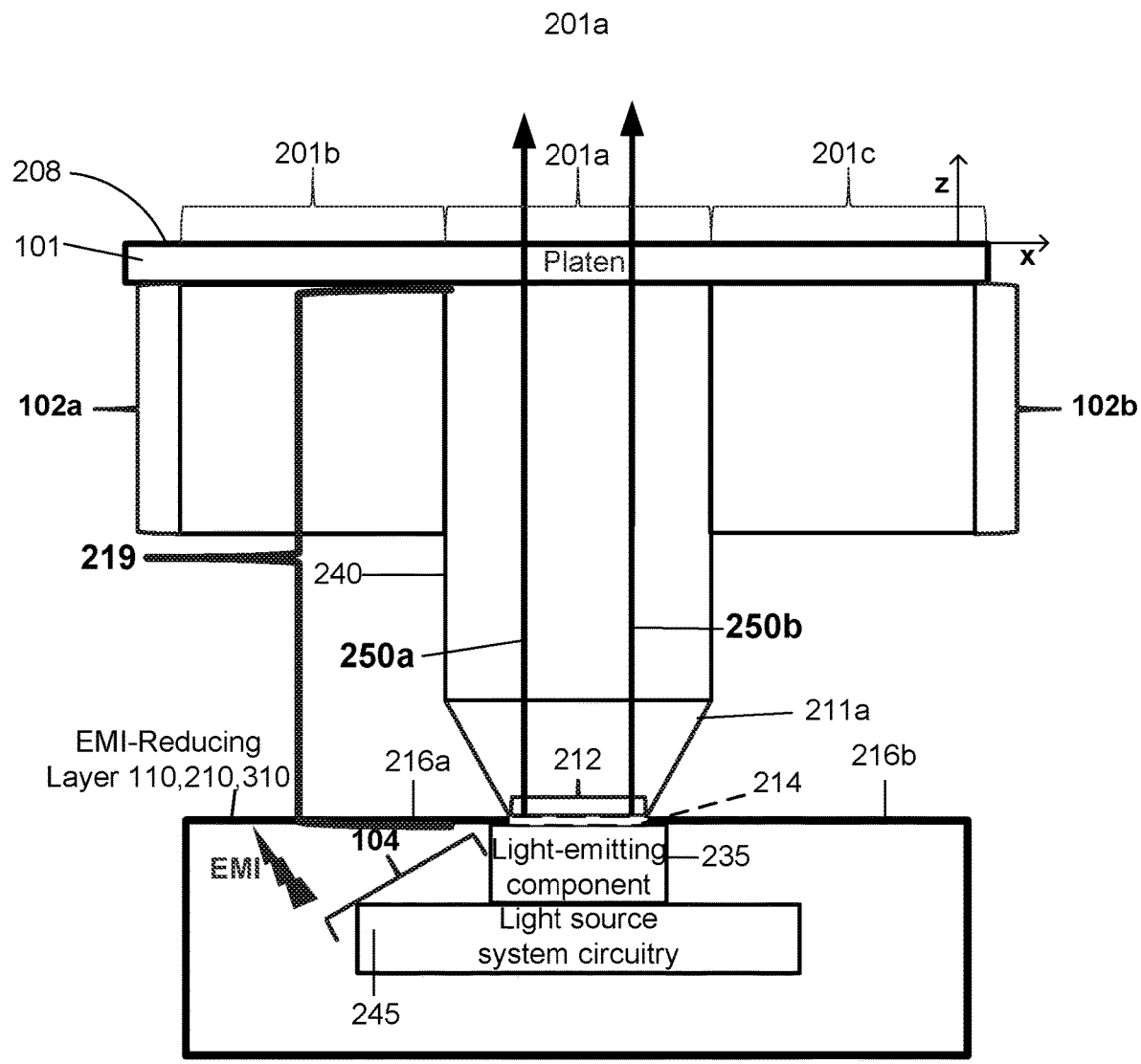

FIG. 3D lacks a light-directing element 211b. In this example, the light-emitting component 235 is coupled to the EMI-reducing layer 210.

According to some alternative examples, the light-directing element 211b may be, or may include, a focusing lens that is configured to focus light from the light-emitting component 235 into the opening 212 or the transparent portion 214. In some such examples, the lens may be a convex lens.

In some alternative examples, the light-directing element 211a may be, or may include, a dispersing lens that is configured to disperse light from the opening 212 or the transparent portion 214 and to provide dispersed light to the light guide component 240. In some such examples, the lens may be a concave lens.

In some alternative examples, the apparatus 100 may lack a light-directing element 211a. According to some such examples, the light guide component 240 may be coupled to the EMI-reducing layer 210. In some such examples, the light guide component 240 may have a width W that is equal to—or approximately equal to—the width of the opening 212 or the width of the transparent portion 214. In this context, "approximately equal to" may mean within 5%, within 10%, etc.

In these examples, the light source system 104 is configured to emit light through an area 201a of the platen 101, which may be referred to herein as a "first area" of the platen 101. In some instances, a target object may be in contact with the area 201a. According to these examples, the light source system 104 is configured to transmit light 213—which is also represented in FIGS. 3A-3D by the light rays 250a and 250b—through the light guide system 219 and the platen area 201a.

The platen 101 may include any suitable material, such as glass, acrylic, polycarbonate, combinations thereof, etc. In some examples, the width W1 of the platen 101 (in the x direction of the coordinate system shown in FIGS. 3A-3D) may be in the range of 2 mm to 10 mm, for example 4 mm, 5 mm, 6 mm, etc. According to some examples, the thickness of the platen 101 (in the z direction of the coordinate system shown in FIGS. 3A-3D) may be in the range of 50 microns to 500 microns, for example 150 microns, 200 microns, 250 microns, 300 microns, etc. In some examples, the apparatus 101 may have a thickness (along the z axis) from the top of the platen 101 to the base of the light source system circuitry that is in the range of 2 mm to 10 mm.

In these examples, the platen 101 includes platen areas 201a, 201b and 201c. According to these examples, the platen area 201a resides adjacent the light guide component 240. Accordingly, at least the platen area 201a includes transparent material in this example. According to some examples, the platen 101 may include one or more anti-reflective layers. In some examples, one or more anti-reflective layers may reside on the platen 101, or proximate the platen 101, for example on or proximate the outer surface 208. According to these examples, the platen area 201b resides proximate the receiver stack portion 102a and the platen area 201c resides proximate the receiver stack portion 102c.

The apparatus 100 shown in FIG. 3B includes all of the elements of the apparatus 100 shown in FIG. 3A, but also includes matching layers 210a and 210b residing between the receiver stack portions 102a and 102b, respectively, and the platen 101. In some examples, the matching layers 210a and 210b may be parts of a continuous matching layer. The matching layers 210a and 210b may have an acoustic impedance that is selected to reduce the reflections of acoustic waves caused by the acoustic impedance contrast between one or more layers of the receiver stack portions 102a and 102b that are adjacent to, or proximate, the matching layers 210a and 210b. According to some examples, the matching layers 210a and 210b may include polyethylene terephthalate (PET).

FIG. 3B also shows a target object on the outer surface 208, which is the finger 255 in this example. Here, the finger 255 is in contact with the platen area 201a. In this example, an arterial wall of the artery 207 produces the photoacoustic waves PA1 and PA1 responsive to the light rays 250a and 250b, respectively. According to this example, the receiver stack portions 102a and 102b are configured to provide ultrasonic image data to a control system (not shown) responsive to the photoacoustic waves PA1 and PAL The apparatus 100 shown in FIG. 3C includes all of the elements of the apparatus 100 shown in FIG. 3B, but also includes additional elements. In this example, a mirror layer 205a, a matching layer 210a and an adhesive layer 215a reside between the platen area 201b and the receiver stack portion 102a. Similarly, in this example a mirror layer 205b, a matching layer 210b and an adhesive layer 215b reside between the platen area 201c and the receiver stack portion 102b. The mirror layers 205a and 205b may be configured to reflect light from the light source system 104—such as light that has reflected from the finger 255—away from the receiver stack portions 102a and 102b. In some examples, the adhesive layers 215a and 215b may include pressure-sensitive adhesive (PSA) material.

In this example, the receiver stack portion 102a includes piezoelectric material 215a, an electrode layer 220a on a first side of the piezoelectric material 215a and an electrode layer 222a on a second side of the piezoelectric material 215a. According to some examples, a layer of anisotropic conductive film (ACF) may reside between each of the electrode layers 220a and 220b and the piezoelectric material 215a. In this example, the electrode layer 222a resides between the piezoelectric material 215a and a backing layer 230a. The electrode layers 220a and 220b include conductive material, which may be, or may include, a conductive metal such as copper in some instances. The electrode layers 220a and 220b may be electrically connected to other elements of receiver system circuitry, which is not shown. The piezoelectric material 215a may, for example, include a polyvinylidene difluoride (PVDF) polymer, a polyvinylidene fluoride-trifluoroethylene (PVDF-TrFE) copolymer, aluminum nitride (AlN), lead zirconate titanate (PZT), piezoelectric composite material, such as a 1-3 composite, a 2-2 composite, a 3-3 composite, etc., or combinations thereof. The backing layer 230a may be configured to suppress at least some acoustic artifacts and may provide a relatively higher signal-to-noise ratio (SNR) than receiver systems 102 that lack a backing layer. In some examples, the backing layer 230a may include metal, epoxy, or a combination thereof.

In some examples, an apparatus 100 may include a light guide system 219 like that shown in FIG. 3D with the additional elements shown in FIG. 3B or the additional elements shown in FIG. 3C.

Figure 4A:
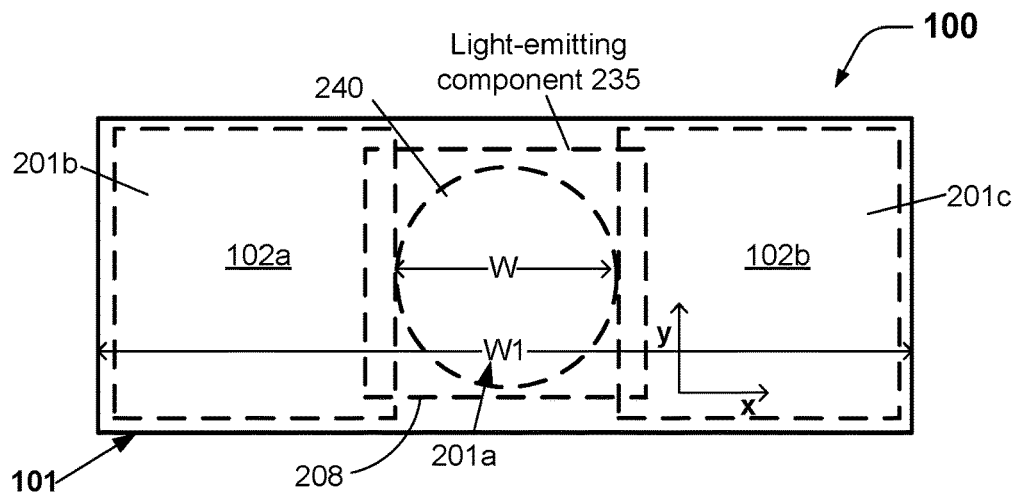
FIGS. 4A, 4B and 4C show different examples of how some components of the apparatus shown in FIGS. 3A-3D may be arranged.
Figure 4B:
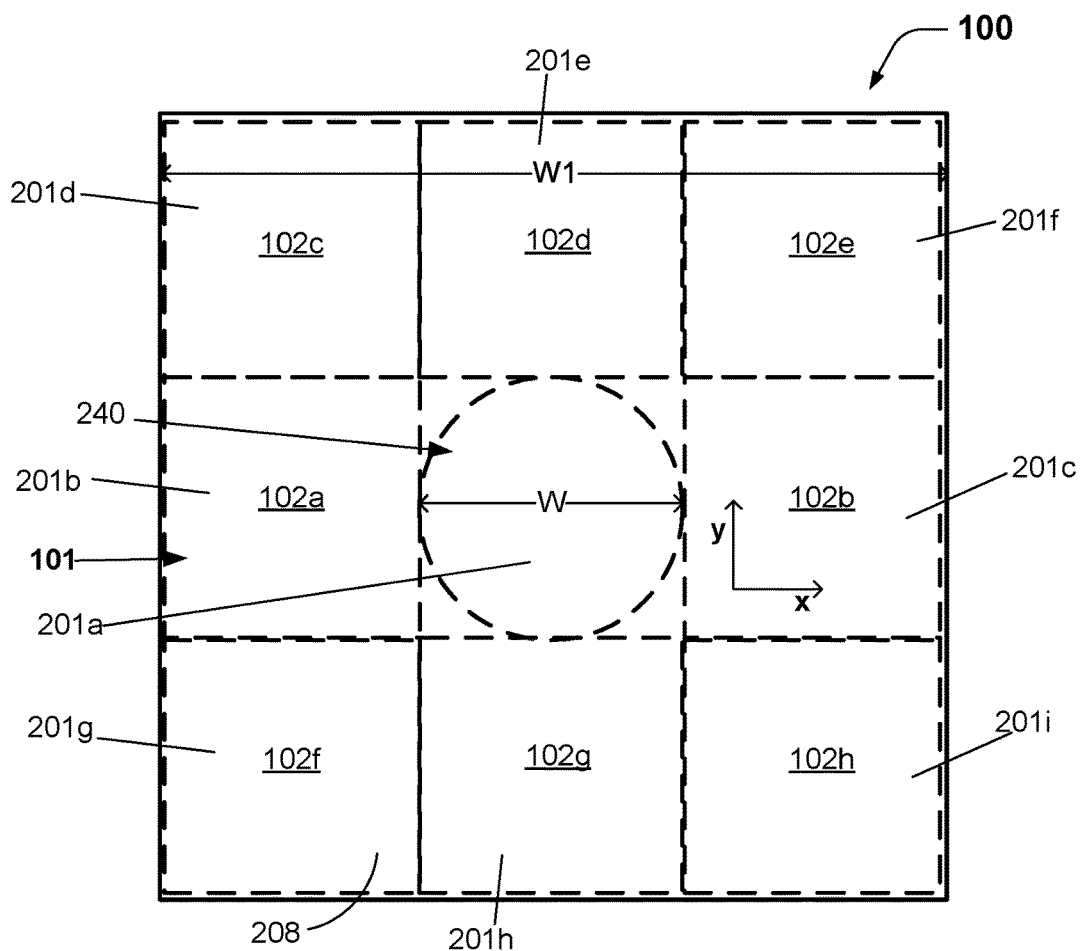
Figure 4C:
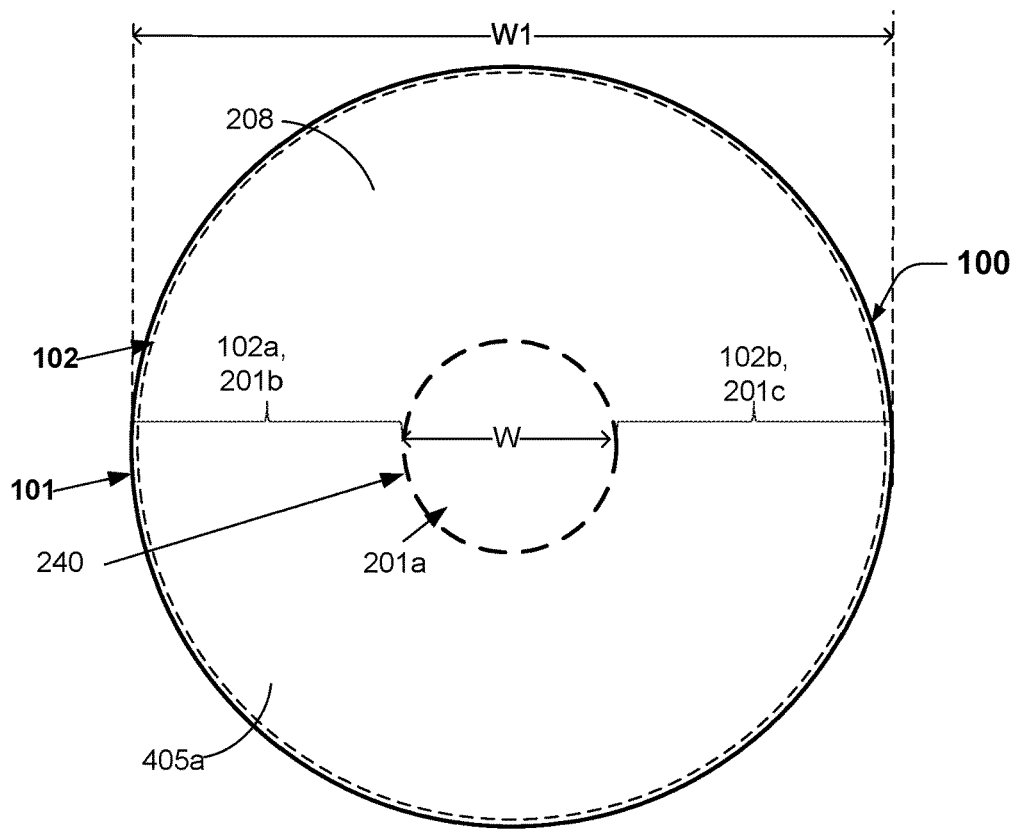

FIGS. 4A, 4B and 4C show different examples of how some components of the apparatus shown in FIGS. 3A-3D may be arranged. As with other figures provided herein, the numbers, types and arrangements of elements shown in FIGS. 4A-4C are merely presented by way of example. In these examples, the apparatus 100 is an instance of the apparatus 100 shown in FIGS. 1 and 3A-3D. In each of these examples, a top view of the apparatus 100 is shown, with the view being along the z axis of the coordinate system shown in FIGS. 3A-3D. In these examples, the light guide component 240 is shown to have a circular cross-section. However, in alternative examples the light guide component 240 may have a different cross-sectional shape, such as a square cross-sectional shape, a rectangular cross-sectional shape, a hexagonal cross-sectional shape, etc.

In these examples, the outlines of the receiver stack portion 102a and the receiver stack portion 102b (and, in FIG. 4B, the outlines of the receiver stack portions 102c-102h) are shown in dashes, indicating that these elements are below the outer surface 208 of the platen 101. According to these examples, the receiver stack portion 102a resides proximate a first side of the light guide component 240 and the receiver stack portion 102b resides proximate a second side of the light guide component 240. In these examples, the receiver stack portion 102a resides proximate (in this example, below, further away from the viewer along the z axis) platen area 102b on a first side of the platen area 102a and the receiver stack portion 102b resides proximate platen area 102c, which is on a second and opposite side of the platen area 102a.

According to the example shown in FIG. 4A, the receiver stack portion 102a and the receiver stack portion 102b are discrete elements of a linear array of receiver stack portions having N receiver elements, with N being 2 in this instance. In alternative examples, N may be greater than 2.

In the example shown in FIG. 4B, the receiver stack portion 102a and the receiver stack portion 102b are discrete elements of a two-dimensional receiver array of receiver stack portions having M receiver elements, with M being 9 in this instance. In alternative examples, M may be greater than or less than 9.

According to the example shown in FIG. 4C, the receiver stack portion 102a and the receiver stack portion 102b are portions of a receiver stack ring 405a. In this example, the receiver stack ring 405a is configured to surround the light guide component 240. According to this example, an annular area of the platen 401 proximate (in this example, above, closer to the viewer along the z axis) the receiver stack ring 405a, which includes the platen areas 201b and 201c, is configured to surround the platen area 201a.

Figure 4D:
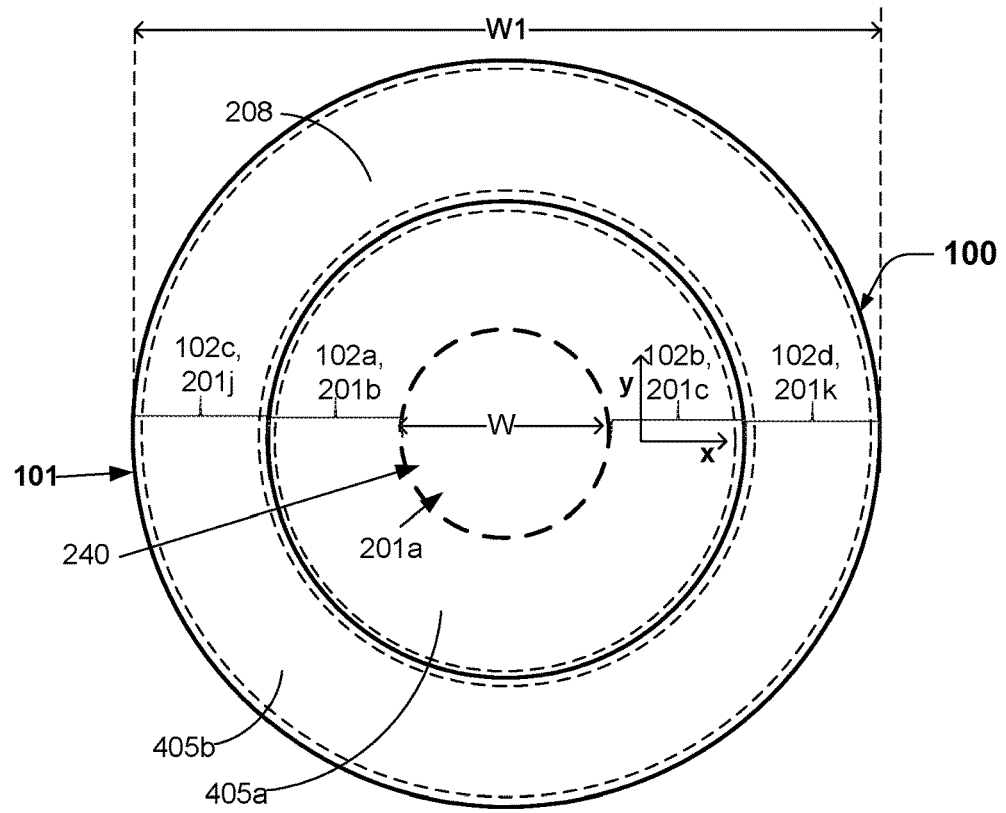
FIG. 4D shows examples of the components of the apparatus shown in FIGS. 3A-3D arranged with additional components.

FIG. 4D shows examples of the components of the apparatus shown in FIGS. 3A-3D arranged with additional components. As with other figures provided herein, the numbers, types and arrangements of elements shown in FIG. 4D are merely presented by way of example. In these examples, the apparatus 100 is an instance of the apparatus 100 shown in FIG. 1. In this example, a top view of the apparatus 100 is shown, with the view being along the z axis of the coordinate system shown in FIGS. 3A-3D. In this example, the light guide component 240 is shown to have a circular cross-section. However, in alternative examples the light guide component 240 may have a different cross-sectional shape.

In this example, the receiver stack portion 102a and the receiver stack portion 102b are portions of a receiver stack ring 405a. According to this example, the receiver stack ring 405a is configured to surround the light guide component 240. In this example, the receiver stack ring 405a includes the receiver stack portions 102a and 102b, as well as the platen areas 201b and 201c. According to this example, the receiver stack ring 405b is configured to surround the receiver stack ring 405a. In this example, the receiver stack ring 405b includes the receiver stack portions 102c and 102d, as well as the platen areas 201j and 201k.

The present inventors contemplate various permutations of the examples shown in FIGS. 1 and 3A-4D and the corresponding descriptions. For example, while FIGS. 3A-4D show light source systems 104 having only a single light-emitting component 235, in some alternative implementations each of these examples may include light source systems 104 having more than one light-emitting component. In some such examples, the light source systems 104 may include L instances of light-emitting components, where L is an integer greater than 1. In some examples, L may be 2, 3, 4, 5, 6, etc.

As noted elsewhere herein, some implementations of the apparatus 100 may include a control system, which may be an instance of the control system 106 of FIG. 1. In some implementations, the control system may be configured to control the light source system 104. According to some implementations, the control system may be configured to receive, from the receiver system 102, signals corresponding to acoustic waves corresponding to a photoacoustic response of a target object to light emitted by the light source system 104.

Figure 5:
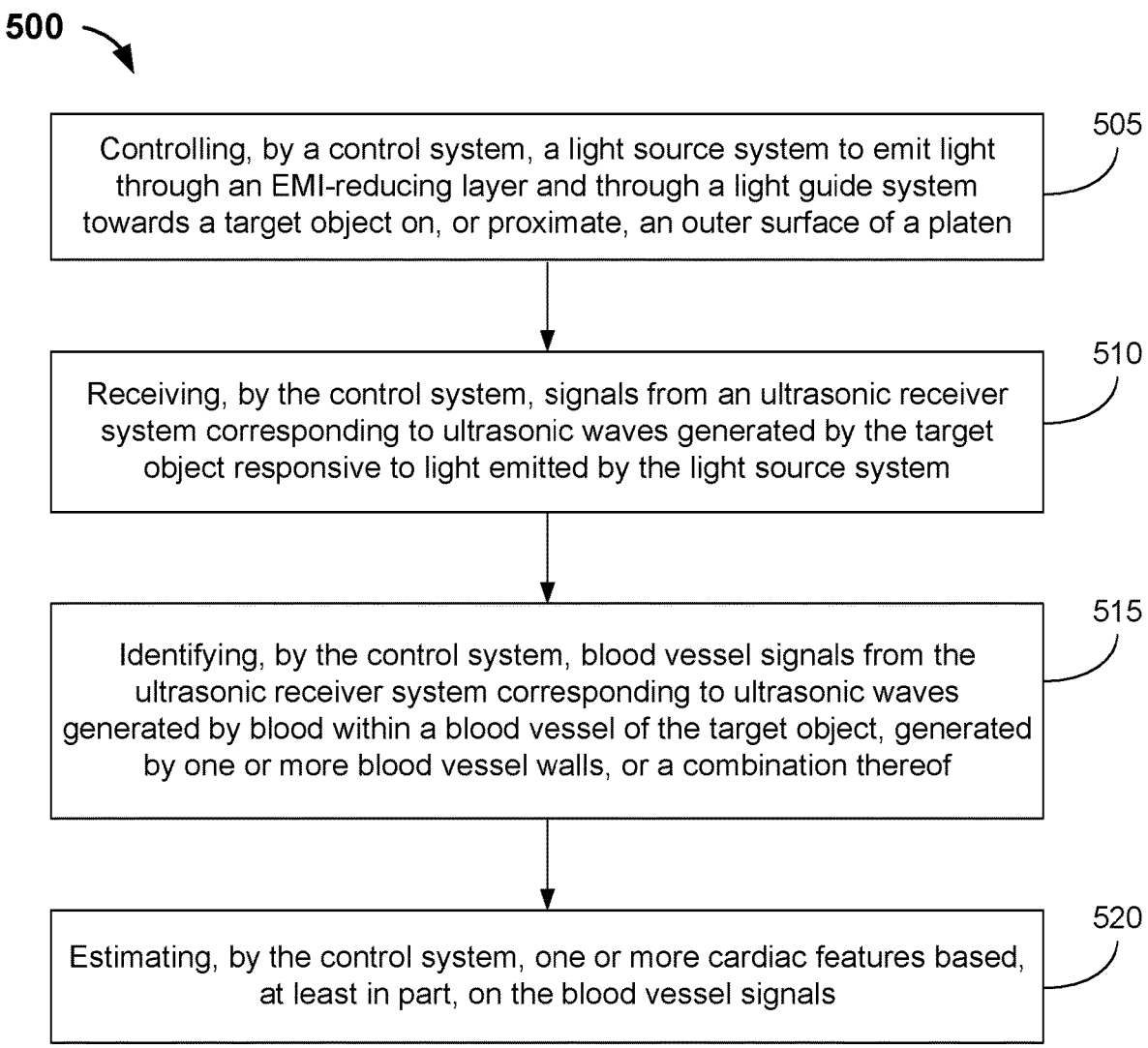
FIG. 5 is a flow diagram that shows examples of some disclosed operations.

FIG. 5 is a flow diagram that shows examples of some disclosed operations. The blocks of FIG. 5 may, for example, be performed by the apparatus 100 of FIG. 1 or by a similar apparatus. For example, the blocks of FIG. 5 may be performed by the control system 106. As with other methods disclosed herein, the method outlined in FIG. 5 may include more or fewer blocks than indicated. Moreover, the blocks of methods disclosed herein are not necessarily performed in the order indicated. In some instances, one or more of the blocks shown in FIG. 5 may be performed concurrently.

In this example, block 505 involves controlling, by a control system, a light source system—which may be an instance of the light source system 104 of FIG. 1—to emit light through an EMI-reducing layer, through a light guide system and towards a target object on, or proximate, an outer surface of a platen. The target object may be a finger, a wrist, etc., depending on the particular example. The EMI-reducing layer and the light guide system may be one of the EMI-reducing layers 210 and one of the light guide systems 104 disclosed herein.

According to this example, block 510 involves receiving, by the control system, signals from an ultrasonic receiver system corresponding to ultrasonic waves generated by the target object responsive to the light emitted by the light source system. The ultrasonic receiver system may be an instance of one of the receiver systems 102 disclosed herein.

According to this example, block 515 involves identifying, by the control system, blood vessel signals from the ultrasonic receiver system corresponding to ultrasonic waves generated by blood within a blood vessel of the target object, by one or more blood vessel walls, or combinations thereof. According to some examples, block 515 may involve identifying, by the control system, arterial signals from the ultrasonic receiver system corresponding to ultrasonic waves generated by blood within an artery of the target object by one or more arterial walls, or combinations thereof. The blood vessel signals may, for example, be identified by implementing a range gate delay (RGD) that corresponds with the expected depth to a blood vessel. Alternatively, or additionally, the arterial signals may be identified according to one or more characteristics of the photoacoustic responses of the blood vessel walls, blood, or a combination thereof.

In this example, block 520 involves estimating, by the control system, one or more cardiac features based, at least in part, on the blood vessel signals. In some examples, block 520 may involve estimating a blood pressure based, at least in part, on the blood vessel signals. In some such examples, block 520 may involve estimating a blood pressure based, at least in part, on arterial signals. According to some examples, block 520, or another aspect of method 500, may involve extracting and evaluating heart rate waveform (HRW) features.

Figure 6:
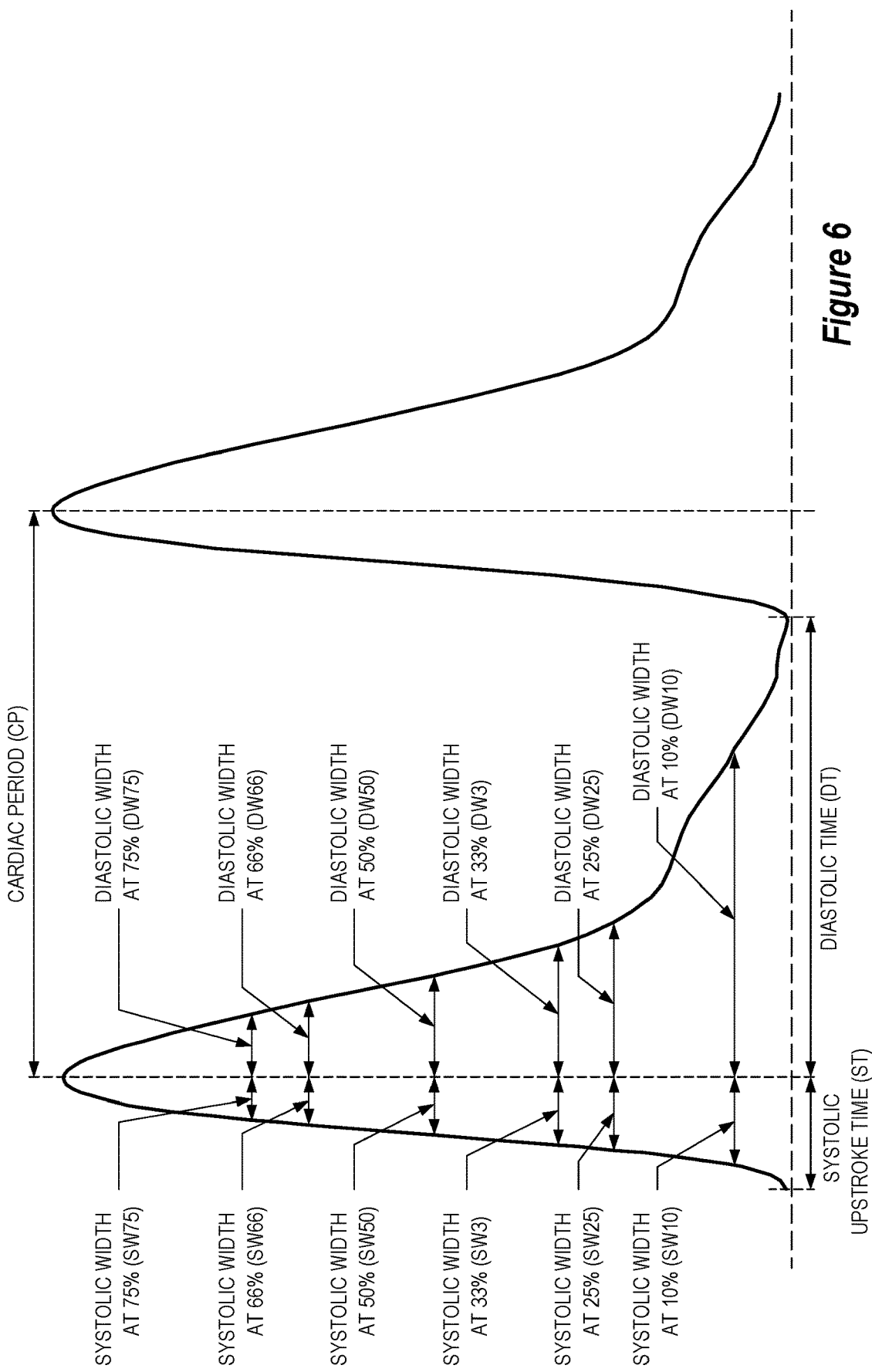
FIG. 6 shows examples of heart rate waveform (HRW) features that may be extracted according to some implementations of the method of FIG. 5.

FIG. 6 shows examples of heart rate waveform (HRW) features that may be extracted according to some implementations of the method of FIG. 5. The horizontal axis of FIG. 6 represents time and the vertical axis represents signal amplitude. The cardiac period is indicated by the time between adjacent peaks of the HRW. The systolic and diastolic time intervals are indicated below the horizontal axis. During the systolic phase of the cardiac cycle, as a pulse propagates through a particular location along an artery, the arterial walls expand according to the pulse waveform and the elastic properties of the arterial walls. Along with the expansion is a corresponding increase in the volume of blood at the particular location or region, and with the increase in volume of blood an associated change in one or more characteristics in the region. Conversely, during the diastolic phase of the cardiac cycle, the blood pressure in the arteries decreases and the arterial walls contract. Along with the contraction is a corresponding decrease in the volume of blood at the particular location, and with the decrease in volume of blood an associated change in the one or more characteristics in the region.

The HRW features that are illustrated in FIG. 6 pertain to the width of the systolic and/or diastolic portions of the HRW curve at various "heights," which are indicated by a percentage of the maximum amplitude. For example, the SW50 feature is the width of the systolic portion of the HRW curve at a "height" of 50% of the maximum amplitude. In some implementations, the HRW features used for blood pressure estimation may include some or all of the SW10, SW25, SW33, SW50, SW66, SW75, DW10, DW25, DW33, DW50, DW66 and DW75 HRW features. In other implementations, additional HRW features may be used for blood pressure estimation. Such additional HRW features may, in some instances, include the sum and ratio of the SW and DW at one or more "heights," e.g., (DW75+SW75), DW75/SW75, (DW66+SW66), DW66/SW66, (DW50+SW50), DW50/SW50, (DW33+SW33), DW33/SW33, (DW25+SW25), DW25/SW25 and/or (DW10+SW10), DW10/SW10. Other implementations may use yet other HRW features for blood pressure estimation. Such additional HRW features may, in some instances, include sums, differences, ratios and/or other operations based on more than one "height," such as (DW75+SW75)/(DW50+SW50), (DW50+SW50/(DW10+SW10), etc.

Figure 7:
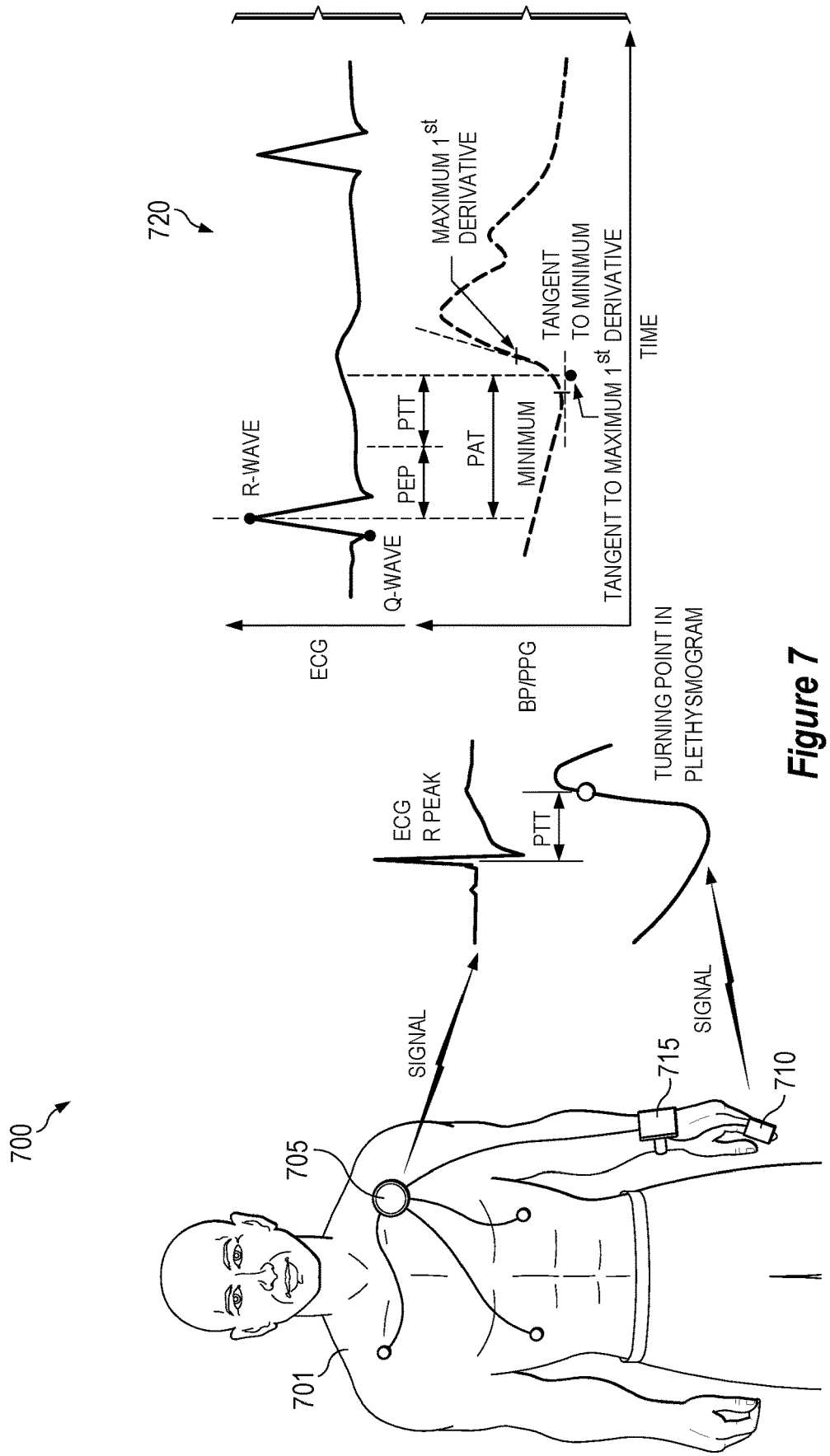
FIG. 7 shows examples of devices that may be used in a system for estimating blood pressure based, at least in part, on pulse transit time (PTT).

FIG. 7 shows examples of devices that may be used in a system for estimating blood pressure based, at least in part, on pulse transit time (PTT). As with other figures provided herein, the numbers, types and arrangements of elements are merely presented by way of example. According to this example, the system 700 includes at least two sensors. In this example, the system 700 includes at least an electrocardiogram sensor 705 and a device 710 that is configured to be mounted on a finger of the person 701. In this example, the device 710 is, or includes, an apparatus configured to perform at least some PAPG methods disclosed herein. For example, the device 710 may be, or may include, the apparatus 300 of FIG. 1 or a similar apparatus.

As noted in the graph 720, the PAT includes two components, the pre-ejection period (PEP, the time needed to convert the electrical signal into a mechanical pumping force and isovolumetric contraction to open the aortic valves) and the PTT. The starting time for the PAT can be estimated based on the QRS complex—an electrical signal characteristic of the electrical stimulation of the heart ventricles. As shown by the graph 720, in this example the beginning of a pulse arrival time (PAT) may be calculated according to an R-Wave peak measured by the electrocardiogram sensor 705 and the end of the PAT may be detected via analysis of signals provided by the device 710. In this example, the end of the PAT is assumed to correspond with an intersection between a tangent to a local minimum value detected by the device 710 and a tangent to a maximum slope/first derivative of the sensor signals after the time of the minimum value.

There are many known algorithms for blood pressure estimation based on the PTT and/or the PAT, some of which are summarized in Table 1 and described in the corresponding text on pages 5-10 of Sharma, M., et al., *Cuff-Less and Continuous Blood Pressure Monitoring: a Methodological Review* ("Sharma"), in Multidisciplinary Digital Publishing Institute (MDPI) Technologies 2017, 5, 21, both of which are hereby incorporated by reference.

Some previously-disclosed methods have involved calculating blood pressure according to one or more of the equations shown in Table 1 of Sharma, or other known equations, based on a PTT and/or PAT measured by a sensor system that includes a PPG sensor. As noted above, some disclosed PAPG-based implementations are configured to distinguish artery HRWs from other HRWs. Such implementations may provide more accurate measurements of the PTT and/or PAT, relative to those measured by a PPG sensor. Therefore, disclosed PAPG-based implementations may provide more accurate blood pressure estimations, even when the blood pressure estimations are based on previously-known formulae.

Other implementations of the system 700 may not include the electrocardiogram sensor 705. In some such implementations, the device 715, which is configured to be mounted on a wrist of the person 701, may be, or may include, an apparatus configured to perform at least some PAPG methods disclosed herein. For example, the device 715 may be, or may include, the apparatus 200 of FIG. 2 or a similar apparatus. According to some such examples, the device 715 may include a light source system and two or more ultrasonic receivers. One example is described below with reference to FIG. 15A. In some examples, the device 715 may include an array of ultrasonic receivers.

In some implementations of the system 700 that do not include the electrocardiogram sensor 705, the device 710 may include a light source system and two or more ultrasonic receivers. One example is described below with reference to FIG. 15B.

Figure 8:
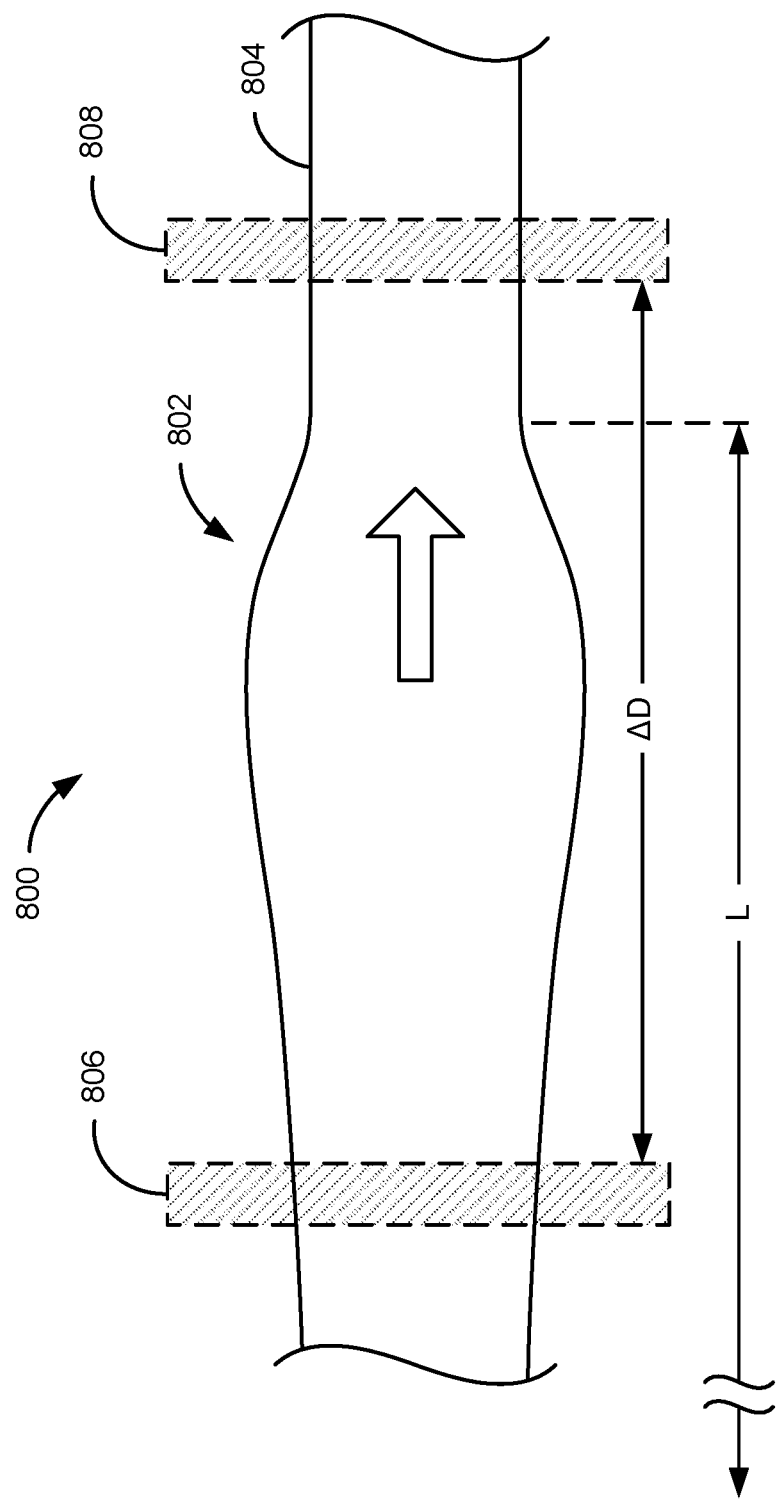
FIG. 8 shows a cross-sectional side view of a diagrammatic representation of a portion of an artery through which a pulse is propagating.

FIG. 8 shows a cross-sectional side view of a diagrammatic representation of a portion of an artery 800 through which a pulse 802 is propagating. The block arrow in FIG. 8 shows the direction of blood flow and pulse propagation. As diagrammatically shown, the propagating pulse 802 causes strain in the arterial walls 804, which is manifested in the form of an enlargement in the diameter (and consequently the cross-sectional area) of the arterial walls—referred to as "distension." The spatial length L of an actual propagating pulse along an artery (along the direction of blood flow) is typically comparable to the length of a limb, such as the distance from a subject's shoulder to the subject's wrist or finger, and is generally less than one meter (m). However, the length L of a propagating pulse can vary considerably from subject to subject, and for a given subject, can vary significantly over durations of time depending on various factors. The spatial length L of a pulse will generally decrease with increasing distance from the heart until the pulse reaches capillaries.

As described above, some particular implementations relate to devices, systems and methods for estimating blood pressure or other cardiovascular characteristics based on estimates of an arterial distension waveform. The terms "estimating," "measuring," "calculating," "inferring," "deducing," "evaluating," "determining" and "monitoring" may be used interchangeably herein where appropriate unless otherwise indicated. Similarly, derivations from the roots of these terms also are used interchangeably where appropriate; for example, the terms "estimate," "measurement," "calculation," "inference" and "determination" also are used interchangeably herein. In some implementations, the pulse wave velocity (PWV) of a propagating pulse may be estimated by measuring the pulse transit time (PTT) of the pulse as it propagates from a first physical location along an artery to another more distal second physical location along the artery. It will be appreciated that this PTT is different from the PTT that is described above with reference to FIG. 15. However, either version of the PTT may be used for the purpose of blood pressure estimation. Assuming that the physical distance ΔD between the first and the second physical locations is ascertainable, the PWV can be estimated as the quotient of the physical spatial distance ΔD traveled by the pulse divided by the time (PTT) the pulse takes in traversing the physical spatial distance ΔD. Generally, a first sensor positioned at the first physical location is used to determine a starting time (also referred to herein as a "first temporal location") at which point the pulse arrives at or propagates through the first physical location. A second sensor at the second physical location is used to determine an ending time (also referred to herein as a "second temporal location") at which point the pulse arrives at or propagates through the second physical location and continues through the remainder of the arterial branch. In such examples, the PTT represents the temporal distance (or time difference) between the first and the second temporal locations (the starting and the ending times).

The fact that measurements of the arterial distension waveform are performed at two different physical locations implies that the estimated PWV inevitably represents an average over the entire path distance ΔD through which the pulse propagates between the first physical location and the second physical location. More specifically, the PWV generally depends on a number of factors including the density of the blood ρ, the stiffness E of the arterial wall (or inversely the elasticity), the arterial diameter, the thickness of the arterial wall, and the blood pressure. Because both the arterial wall elasticity and baseline resting diameter (for example, the diameter at the end of the ventricular diastole period) vary significantly throughout the arterial system, PWV estimates obtained from PTT measurements are inherently average values (averaged over the entire path length ΔD between the two locations where the measurements are performed).

In traditional methods for obtaining PWV, the starting time of the pulse has been obtained at the heart using an electrocardiogram (ECG) sensor, which detects electrical signals from the heart. For example, the starting time can be estimated based on the Q complex—an electrical signal characteristic of the electrical stimulation of the heart ventricles. In such approaches, the ending time of the pulse is typically obtained using a different sensor positioned at a second location (for example, a finger). As a person having ordinary skill in the art will appreciate, there are numerous arterial discontinuities, branches, and variations along the entire path length from the heart to the finger. The PWV can change by as much as or more than an order of magnitude along various stretches of the entire path length from the heart to the finger. As such, PWV estimates based on such long path lengths are unreliable.

In various implementations described herein, PTT estimates are obtained based on measurements (also referred to as "arterial distension data" or more generally as "sensor data") associated with an arterial distension signal obtained by each of a first arterial distension sensor 806 and a second arterial distension sensor 808 proximate first and second physical locations, respectively, along an artery of interest. In some particular implementations, the first arterial distension sensor 806 and the second arterial distension sensor 808 are advantageously positioned proximate first and second physical locations between which arterial properties of the artery of interest, such as wall elasticity and diameter, can be considered or assumed to be relatively constant. In this way, the PWV calculated based on the PTT estimate is more representative of the actual PWV along the particular segment of the artery. In turn, the blood pressure P estimated based on the PWV is more representative of the true blood pressure. In some implementations, the magnitude of the distance ΔD of separation between the first arterial distension sensor 806 and the second arterial distension sensor 808 (and consequently the distance between the first and the second locations along the artery) can be in the range of about 1 centimeter (cm) to tens of centimeters—long enough to distinguish the arrival of the pulse at the first physical location from the arrival of the pulse at the second physical location, but close enough to provide sufficient assurance of arterial consistency. In some specific implementations, the distance ΔD between the first and the second arterial distension sensors 806 and 808 can be in the range of about 1 cm to about 30 cm, and in some implementations, less than or equal to about 20 cm, and in some implementations, less than or equal to about 10 cm, and in some specific implementations less than or equal to about 5 cm. In some other implementations, the distance ΔD between the first and the second arterial distension sensors 806 and 808 can be less than or equal to 1 cm, for example, about 0.1 cm, about 0.25 cm, about 0.5 cm or about 0.75 cm. By way of reference, a typical PWV can be about 15 meters per second (m/s). Using an ambulatory monitoring device in which the first and the second arterial distension sensors 806 and 808 are separated by a distance of about 5 cm, and assuming a PWV of about 15 m/s implies a PTT of approximately 3.3 milliseconds (ms).

The value of the magnitude of the distance ΔD between the first and the second arterial distension sensors 806 and 808, respectively, can be preprogrammed into a memory within a monitoring device that incorporates the sensors (for example, such as a memory of, or a memory configured for communication with, the control system 306 that is described above with reference to FIG. 1). As will be appreciated by a person of ordinary skill in the art, the spatial length L of a pulse can be greater than the distance ΔD from the first arterial distension sensor 806 to the second arterial distension sensor 808 in such implementations. As such, although the diagrammatic pulse 802 shown in FIG. 8 is shown as having a spatial length L comparable to the distance between the first arterial distension sensor 806 and the second arterial distension sensor 808, in actuality each pulse can typically have a spatial length L that is greater and even much greater than (for example, about an order of magnitude or more than) the distance ΔD between the first and the second arterial distension sensors 806 and 808.

Sensing Architecture and Topology

In some implementations of the ambulatory monitoring devices disclosed herein, both the first arterial distension sensor 806 and the second arterial distension sensor 808 are sensors of the same sensor type. In some such implementations, the first arterial distension sensor 806 and the second arterial distension sensor 808 are identical sensors. In such implementations, each of the first arterial distension sensor 806 and the second arterial distension sensor 808 utilizes the same sensor technology with the same sensitivity to the arterial distension signal caused by the propagating pulses, and has the same time delays and sampling characteristics. In some implementations, each of the first arterial distension sensor 806 and the second arterial distension sensor 808 is configured for photoacoustic plethysmography (PAPG) sensing, e.g., as disclosed elsewhere herein. Some such implementations include a light source system and two or more ultrasonic receivers, which may be instances of the light source system 104 and the receiver system 102 of FIG. 1. In some implementations, each of the first arterial distension sensor 806 and the second arterial distension sensor 808 is configured for ultrasound sensing via the transmission of ultrasonic signals and the receipt of corresponding reflections. In some alternative implementations, each of the first arterial distension sensor 806 and the second arterial distension sensor 808 may be configured for impedance plethysmography (IPG) sensing, also referred to in biomedical contexts as bioimpedance sensing. In various implementations, whatever types of sensors are utilized, each of the first and the second arterial distension sensors 806 and 808 broadly functions to capture and provide arterial distension data indicative of an arterial distension signal resulting from the propagation of pulses through a portion of the artery proximate to which the respective sensor is positioned. For example, the arterial distension data can be provided from the sensor to a processor in the form of voltage signal generated or received by the sensor based on an ultrasonic signal or an impedance signal sensed by the respective sensor.

As described above, during the systolic phase of the cardiac cycle, as a pulse propagates through a particular location along an artery, the arterial walls expand according to the pulse waveform and the elastic properties of the arterial walls. Along with the expansion is a corresponding increase in the volume of blood at the particular location or region, and with the increase in volume of blood an associated change in one or more characteristics in the region. Conversely, during the diastolic phase of the cardiac cycle, the blood pressure in the arteries decreases and the arterial walls contract. Along with the contraction is a corresponding decrease in the volume of blood at the particular location, and with the decrease in volume of blood an associated change in the one or more characteristics in the region.

In the context of bioimpedance sensing (or impedance plethysmography), the blood in the arteries has a greater electrical conductivity than that of the surrounding or adjacent skin, muscle, fat, tendons, ligaments, bone, lymph or other tissues. The susceptance (and thus the permittivity) of blood also is different from the susceptances (and permittivities) of the other types of surrounding or nearby tissues. As a pulse propagates through a particular location, the corresponding increase in the volume of blood results in an increase in the electrical conductivity at the particular location (and more generally an increase in the admittance, or equivalently a decrease in the impedance). Conversely, during the diastolic phase of the cardiac cycle, the corresponding decrease in the volume of blood results in an increase in the electrical resistivity at the particular location (and more generally an increase in the impedance, or equivalently a decrease in the admittance).

A bioimpedance sensor generally functions by applying an electrical excitation signal at an excitation carrier frequency to a region of interest via two or more input electrodes, and detecting an output signal (or output signals) via two or more output electrodes. In some more specific implementations, the electrical excitation signal is an electrical current signal injected into the region of interest via the input electrodes. In some such implementations, the output signal is a voltage signal representative of an electrical voltage response of the tissues in the region of interest to the applied excitation signal. The detected voltage response signal is influenced by the different, and in some instances time-varying, electrical properties of the various tissues through which the injected excitation current signal is passed. In some implementations in which the bioimpedance sensor is operable to monitor blood pressure, heartrate or other cardiovascular characteristics, the detected voltage response signal is amplitude- and phase-modulated by the time-varying impedance (or inversely the admittance) of the underlying arteries, which fluctuates synchronously with the user's heartbeat as described above. To determine various biological characteristics, information in the detected voltage response signal is generally demodulated from the excitation carrier frequency component using various analog or digital signal processing circuits, which can include both passive and active components.

In some examples incorporating ultrasound sensors, measurements of arterial distension may involve directing ultrasonic waves into a limb towards an artery, for example, via one or more ultrasound transducers. Such ultrasound sensors also are configured to receive reflected waves that are based, at least in part, on the directed waves. The reflected waves may include scattered waves, specularly reflected waves, or both scattered waves and specularly reflected waves. The reflected waves provide information about the arterial walls, and thus the arterial distension.

In some implementations, regardless of the type of sensors utilized for the first arterial distension sensor 806 and the second arterial distension sensor 808, both the first arterial distension sensor 806 and the second arterial distension sensor 808 can be arranged, assembled or otherwise included within a single housing of a single ambulatory monitoring device. As described above, the housing and other components of the monitoring device can be configured such that when the monitoring device is affixed or otherwise physically coupled to a subject, both the first arterial distension sensor 806 and the second arterial distension sensor 808 are in contact with or in close proximity to the skin of the user at first and second locations, respectively, separated by a distance $\Delta D$, and in some implementations, along a stretch of the artery between which various arterial properties can be assumed to be relatively constant. In various implementations, the housing of the ambulatory monitoring device is a wearable housing or is incorporated into or integrated with a wearable housing. In some specific implementations, the wearable housing includes (or is connected with) a physical coupling mechanism for removable non-invasive attachment to the user. The housing can be formed using any of a variety of suitable manufacturing processes, including injection molding and vacuum forming, among others. In addition, the housing can be made from any of a variety of suitable materials, including, but not limited to, plastic, metal, glass, rubber and ceramic, or combinations of these or other materials. In particular implementations, the housing and coupling mechanism enable full ambulatory use. In other words, some implementations of the wearable monitoring devices described herein are noninvasive, not physically-inhibiting and generally do not restrict the free uninhibited motion of a subject's arms or legs, enabling continuous or periodic monitoring of cardiovascular characteristics such as blood pressure even as the subject is mobile or otherwise engaged in a physical activity. As such, the ambulatory monitoring device facilitates and enables long-term wearing and monitoring (for example, over days, weeks or a month or more without interruption) of one or more biological characteristics of interest to obtain a better picture of such characteristics over extended durations of time, and generally, a better picture of the user's health.

Figure 9A:
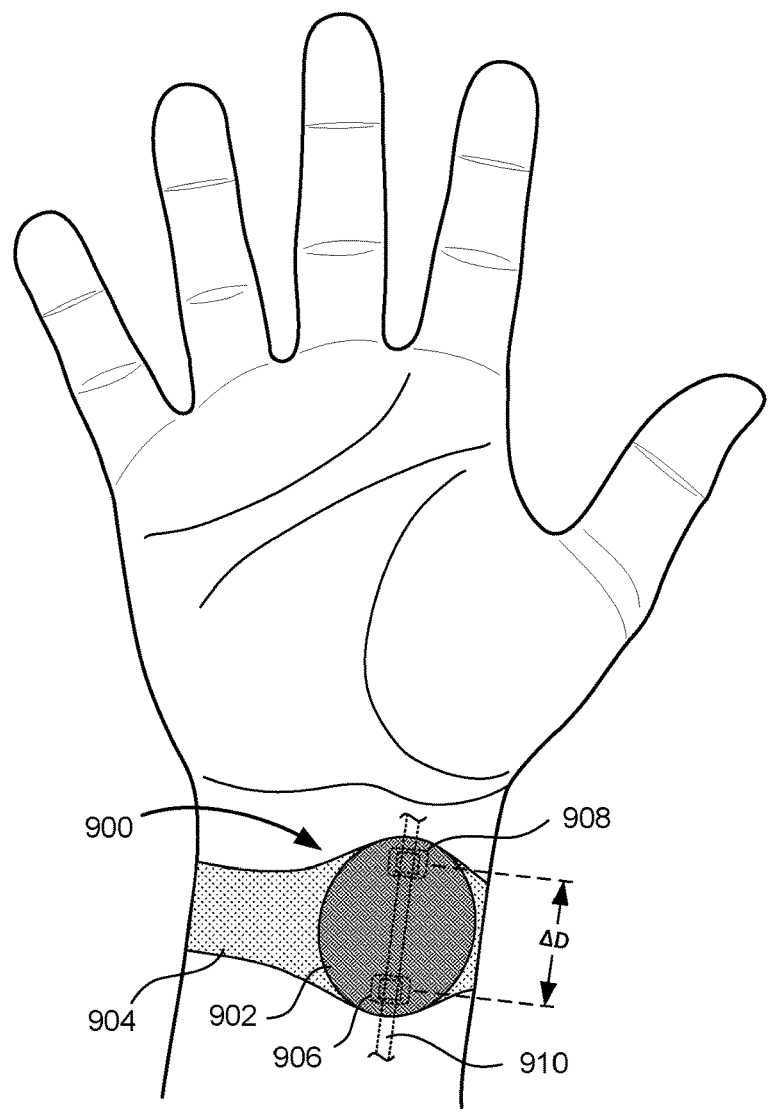
FIG. 9A shows an example ambulatory monitoring device designed to be worn around a wrist according to some implementations.

In some implementations, the ambulatory monitoring device can be positioned around a wrist of a user with a strap or band, similar to a watch or fitness/activity tracker. FIG. 9A shows an example ambulatory monitoring device 900 designed to be worn around a wrist according to some implementations. In the illustrated example, the monitoring device 900 includes a housing 902 integrally formed with, coupled with or otherwise integrated with a wristband 904. The first and the second arterial distension sensors 906 and 908 may, in some instances, each include an instance of the ultrasonic receiver system 102 and a portion of the light source system 104 that are described above with reference to FIG. 1. In this example, the ambulatory monitoring device 900 is coupled around the wrist such that the first and the second arterial distension sensors 906 and 908 within the housing 902 are each positioned along a segment of the radial artery 910 (note that the sensors are generally hidden from view from the external or outer surface of the housing facing the subject while the monitoring device is coupled with the subject, but exposed on an inner surface of the housing to enable the sensors to obtain measurements through the subject's skin from the underlying artery). Also as shown, the first and the second arterial distension sensors 906 and 908 are separated by a fixed distance ΔD. In some other implementations, the ambulatory monitoring device 900 can similarly be designed or adapted for positioning around a forearm, an upper arm, an ankle, a lower leg, an upper leg, or a finger (all of which are hereinafter referred to as "limbs") using a strap or band.

Figure 9B:
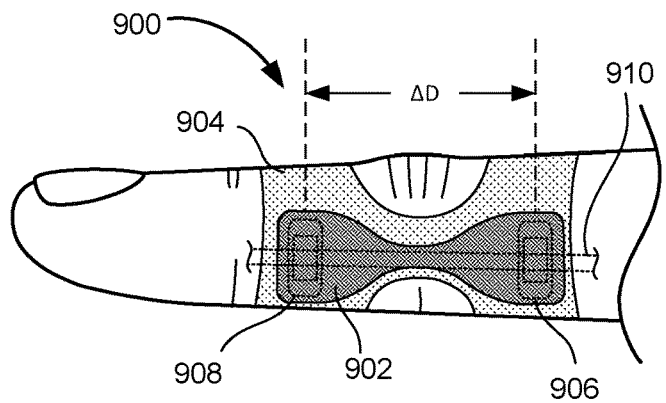
FIG. 9B shows an example ambulatory monitoring device 900 designed to be worn on a finger according to some implementations.

FIG. 9B shows an example ambulatory monitoring device 900 designed to be worn on a finger according to some implementations. The first and the second arterial distension sensors 906 and 908 may, in some instances, each include an instance of the ultrasonic receiver 102 and a portion of the light source system 104 that are described above with reference to FIG. 1.

In some other implementations, the ambulatory monitoring devices disclosed herein can be positioned on a region of interest of the user without the use of a strap or band. For example, the first and the second arterial distension sensors 906 and 908 and other components of the monitoring device can be enclosed in a housing that is secured to the skin of a region of interest of the user using an adhesive or other suitable attachment mechanism (an example of a "patch" monitoring device).

Figure 9C:
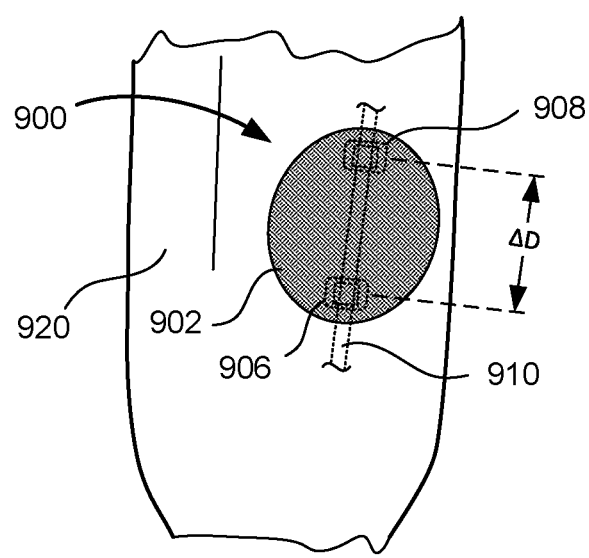
FIG. 9C shows an example ambulatory monitoring device 900 designed to reside on an earbud according to some implementations.

FIG. 9C shows an example ambulatory monitoring device 900 designed to reside on an earbud according to some implementations. According to this example, the ambulatory monitoring device 900 is coupled to the housing of an earbud 920. The first and second arterial distension sensors 906 and 908 may, in some instances, each include an instance of the ultrasonic receiver 102 and a portion of the light source system 104 that are described above with reference to FIG. 1.

Implementation examples are described in the following numbered clauses:

1. An apparatus, including: a platen; an electromagnetic interference (EMI)-reducing system including a first EMI-reducing layer; a light source system configured to emit light through an opening in the first EMI-reducing layer to a first platen area, the light source system including a light-emitting component, light source system circuitry and a light guide system, the light guide system being configured to transmit light from the light-emitting component to the first platen area, the light guide system including a light pipe residing between the first EMI-reducing layer and the platen, the light guide system further including a first light-directing element for directing light from the opening in the first EMI-reducing layer to the light pipe; and a receiver system including an array of receiver elements and receiver system circuitry, the receiver system being configured to detect acoustic waves corresponding to a photoacoustic response of a target object in contact with the first platen area to light emitted by the light source system, where the first EMI-reducing layer reduces a level of EMI emitted by the light source system circuitry that is received by the receiver system circuitry.
2. The apparatus of clause 1, where the light pipe has a greater width than a width of the opening in the first EMI-reducing layer.
3. The apparatus of clause 2, where the first light-directing element is configured to disperse light emerging from the opening in the first EMI-reducing layer and to provide dispersed light to the light pipe.
4. The apparatus of clause 2 or clause 3, where the first light-directing element is, or includes, a dispersing lens.
5. The apparatus of clause 2 or clause 3, where the first light-directing element is, or includes, a tapered element having a smaller-width portion adjacent the opening in the first EMI-reducing layer and a larger-width portion adjacent the light pipe.
6. The apparatus of any one of clauses 1-5, where the light-emitting component is adjacent the opening in the first EMI-reducing layer.
7. The apparatus of any one of clauses 1-6, where the light guide system includes a second light-directing element for directing light from the light-emitting component to the opening in the first EMI-reducing layer.
8. The apparatus of clause 7, where the second light-directing element is, or includes, a focusing lens.
9. The apparatus of clause 7, where the light-emitting component has a greater width than a width of the opening in the first EMI-reducing layer and where the second light-directing element is, or includes, a tapered element having a smaller-width portion adjacent the opening in the first EMI-reducing layer and a larger-width portion adjacent the light-emitting component.
10. The apparatus of any one of clauses 1-9, where the light source system circuitry is grounded separately from the receiver system circuitry.
11. The apparatus of any one of clauses 1-10, where the first EMI-reducing layer is a portion of an EMI-reducing component that encloses the light source system circuitry.
12. The apparatus of any one of clauses 1-11, where the EMI-reducing system includes an EMI-reducing component that encloses the receiver system circuitry.

13. The apparatus of any one of clauses 1-12, where the receiver system includes at least a first receiver stack portion residing proximate a first side of the light pipe and a second receiver stack portion residing proximate a second side of the light pipe.

14. The apparatus of clause 13, where the first receiver stack portion resides proximate a second platen area on a first side of the first platen area and where the second receiver stack portion resides proximate a third platen area on a second and opposite side of the first platen area.

15. The apparatus of clause 13 or clause 14, where the first receiver stack portion and the second receiver stack portion are portions of a receiver stack ring.

16. The apparatus of clause 15, where the receiver stack ring is configured to surround the light pipe.

17. The apparatus of clause 15 or clause 16, where an annular area of the platen proximate the receiver stack ring is configured to surround the first platen area.

18. The apparatus of any one of clauses 1-19, where the first EMI-reducing layer includes a conductive material having a resistivity of less than 3×10-8 ohm-meters.

19. The apparatus of any one of clauses 1-18, where the first EMI-reducing layer includes a material having a magnetic permeability of at least 5×10-3 henries per meter.

20. An apparatus, including: a platen; an electromagnetic interference (EMI)-reducing system including a first EMI-reducing layer; a light source system configured to emit light through a transparent portion of the first EMI-reducing layer to a first platen area, the light source system including a light-emitting component, light source system circuitry and a light guide system, the light guide system being configured to transmit light from the light-emitting component to the first platen area, the light guide system including a light pipe residing between the first EMI-reducing layer and the platen; and a receiver system including an array of receiver elements and receiver system circuitry, the receiver system being configured to detect acoustic waves corresponding to a photoacoustic response of a target object in contact with the first platen area to light emitted by the light source system, where the first EMI-reducing layer reduces a level of EMI emitted by the light source system circuitry that is received by the receiver system circuitry.

21. The apparatus of clause 20, where the light source system circuitry is grounded separately from the receiver system circuitry.

22. The apparatus of clause 20 or clause 21, where the first EMI-reducing layer is a portion of an EMI-reducing component that encloses the light source system circuitry.

23. The apparatus of any one of clauses 20-22, where the EMI-reducing system includes an EMI-reducing component that encloses the receiver system circuitry.

24. The apparatus of any one of clauses 20-23, where the receiver system includes at least a first receiver stack portion residing proximate a first side of the light pipe and a second receiver stack portion residing proximate a second side of the light pipe.

25. The apparatus of clause 24, where the first receiver stack portion resides proximate a second platen area on a first side of the first platen area and where the second receiver stack portion resides proximate a third platen area on a second and opposite side of the first platen area.

26. The apparatus of clause 24 or clause 25, where the first receiver stack portion and the second receiver stack portion are portions of a receiver stack ring that is configured to surround the light pipe.

27. The apparatus of any one of clauses 20-26, where the first EMI-reducing layer includes a conductive material having a resistivity of less than 3×10-8 ohm-meters, a material having a magnetic permeability of at least 5×10-3 henries per meter, or a combination thereof.

28. The apparatus of any one of clauses 20-27, where the light-emitting component is adjacent the transparent portion of the first EMI-reducing layer.

29. The apparatus of any one of clauses 20-28, where the transparent portion of the first EMI-reducing layer is, or includes, a transparent conductive material.

30. The apparatus of clause 29, where the transparent conductive material is, or includes, indium tin oxide.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Various modifications to the implementations described in this disclosure may be readily apparent to those skilled in the art, and the generic principles defined herein may be applied to other implementations without departing from the spirit or scope of this disclosure. Thus, the following claims are not intended to be limited to the implementations shown herein, but are to be accorded the widest scope consistent with this disclosure, the principles and the novel features disclosed herein.

Additionally, certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. Moreover, various ones of the described and illustrated operations can itself include and collectively refer to a number of sub-operations. For example, each of the operations described above can itself involve the execution of a process or algorithm. Furthermore, various ones of the described and illustrated operations can be combined or performed in parallel in some implementations. Similarly, the separation of various system components in the implementations described above should not be understood as requiring such separation in all implementations. As such, other implementations are within the scope of the following claims. In some cases, the actions recited in the claims can be performed in a different order and still achieve desirable results.

What is claimed is:

1. An apparatus, comprising:
    a platen;
    an electromagnetic interference (EMI)-reducing system including a first EMI-reducing layer;
    a light source system configured to emit light through an opening in the first EMI-reducing layer to a first platen area, the light source system including a light-emitting component, light source system circuitry and a light guide system, the light guide system being configured to transmit light from the light-emitting component to the first platen area, the light guide system including a light pipe residing between the first EMI-reducing layer and the platen, the light guide system further including a first light-directing element for directing light from the opening in the first EMI-reducing layer to the light pipe; and a receiver system including an array of receiver elements and receiver system circuitry, the receiver system being configured to detect acoustic waves corresponding to a photoacoustic response of a target object in contact with the first platen area to light emitted by the light source system, wherein the first EMI-reducing layer reduces a level of EMI emitted by the light source system circuitry that is received by the receiver system circuitry, wherein the first EMI-reducing layer includes a conductive material having a resistivity of less than $3 \times 10^{-8}$ ohm-meters, a material having a magnetic permeability of at least $5 \times 10^{-3}$ henries per meter, or a combination thereof.

2. The apparatus of claim 1, wherein the light pipe has a greater width than a width of the opening in the first EMI-reducing layer.

3. The apparatus of claim 2, wherein the first light-directing element is configured to disperse light emerging from the opening in the first EMI-reducing layer and to provide dispersed light to the light pipe.

4. The apparatus of claim 2, wherein the first light-directing element comprises a dispersing lens.

5. The apparatus of claim 2, wherein the first light-directing element comprises a tapered element having a smaller-width portion adjacent the opening in the first EMI-reducing layer and a larger-width portion adjacent the light pipe.

6. The apparatus of claim 1, wherein the light-emitting component is adjacent the opening in the first EMI-reducing layer.

7. The apparatus of claim 1, wherein the light guide system includes a second light-directing element for directing light from the light-emitting component to the opening in the first EMI-reducing layer.

8. The apparatus of claim 7, wherein the second light-directing element comprises a focusing lens.

9. The apparatus of claim 7, wherein the light-emitting component has a greater width than a width of the opening in the first EMI-reducing layer and wherein the second light-directing element comprises a tapered element having a smaller-width portion adjacent the opening in the first EMI-reducing layer and a larger-width portion adjacent the light-emitting component.

10. The apparatus of claim 1, wherein the light source system circuitry is grounded separately from the receiver system circuitry.

11. The apparatus of claim 1, wherein the first EMI-reducing layer is a portion of an EMI-reducing component that encloses the light source system circuitry.

12. The apparatus of claim 1, wherein the EMI-reducing system includes an EMI-reducing component that encloses the receiver system circuitry.

13. The apparatus of claim 1, wherein the receiver system includes at least a first receiver stack portion residing proximate a first side of the light pipe and a second receiver stack portion residing proximate a second side of the light pipe.

14. The apparatus of claim 13, wherein the first receiver stack portion resides proximate a second platen area on a first side of the first platen area and wherein the second receiver stack portion resides proximate a third platen area on a second and opposite side of the first platen area.

15. The apparatus of claim 13, wherein the first receiver stack portion and the second receiver stack portion are portions of a receiver stack ring.

16. The apparatus of claim 15, wherein the receiver stack ring is configured to surround the light pipe.

17. The apparatus of claim 15, wherein an annular area of the platen proximate the receiver stack ring is configured to surround the first platen area.

18. An apparatus, comprising:
a platen;
an electromagnetic interference (EMI)-reducing system including a first EMI-reducing layer;
a light source system configured to emit light through a transparent portion of the first EMI-reducing layer to a first platen area, the light source system including a light-emitting component, light source system circuitry and a light guide system, the light guide system being configured to transmit light from the light-emitting component to the first platen area, the light guide system including a light pipe residing between the first EMI-reducing layer and the platen; and a receiver system including an array of receiver elements and receiver system circuitry, the receiver system being configured to detect acoustic waves corresponding to a photoacoustic response of a target object in contact with the first platen area to light emitted by the light source system, wherein the first EMI-reducing layer reduces a level of EMI emitted by the light source system circuitry that is received by the receiver system circuitry, wherein the first EMI-reducing layer includes a conductive material having a resistivity of less than $3 \times 10^{-8}$ ohm-meters, a material having a magnetic permeability of at least $5 \times 10^{-3}$ henries per meter, or a combination thereof.

19. The apparatus of claim 18, wherein the light source system circuitry is grounded separately from the receiver system circuitry.

20. The apparatus of claim 18, wherein the first EMI-reducing layer is a portion of an EMI-reducing component that encloses the light source system circuitry.

21. The apparatus of claim 18, wherein the EMI-reducing system includes an EMI-reducing component that encloses the receiver system circuitry.

22. The apparatus of claim 18, wherein the receiver system includes at least a first receiver stack portion residing proximate a first side of the light pipe and a second receiver stack portion residing proximate a second side of the light pipe.

23. The apparatus of claim 22, wherein the first receiver stack portion resides proximate a second platen area on a first side of the first platen area and wherein the second receiver stack portion resides proximate a third platen area on a second and opposite side of the first platen area.

24. The apparatus of claim 22, wherein the first receiver stack portion and the second receiver stack portion are portions of a receiver stack ring that is configured to surround the light pipe.

25. The apparatus of claim 18, wherein the light-emitting component is adjacent the transparent portion of the first EMI-reducing layer.

26. The apparatus of claim 18, wherein the transparent portion of the first EMI-reducing layer comprises a transparent conductive material.

27. The apparatus of claim 26, wherein the transparent conductive material comprises indium tin oxide.

* * * * *